(12) United States Patent
Mizoguchi et al.

(10) Patent No.: US 10,336,478 B2
(45) Date of Patent: Jul. 2, 2019

(54) VISCOUS-MATERIAL FILLING METHOD

(71) Applicant: KAGA WORKS CO., LTD., Nagoya-Shi (JP)

(72) Inventors: Osamu Mizoguchi, Nagoya (JP); Hitoshi Tsujikawa, Nagoya (JP)

(73) Assignee: KAGA WORKS CO., LTD., Nagoya-Shi (JP)

( * ) Notice: Subject to any disclaimer, the term of this patent is extended or adjusted under 35 U.S.C. 154(b) by 0 days.

(21) Appl. No.: 15/642,936

(22) Filed: Jul. 6, 2017

(65) Prior Publication Data

US 2017/0297751 A1    Oct. 19, 2017

Related U.S. Application Data

(63) Continuation of application No. 15/097,746, filed on Apr. 13, 2016, now Pat. No. 9,731,846, which is a
(Continued)

(30) Foreign Application Priority Data

Aug. 24, 2010    (JP) .................................. 2010-187032

(51) Int. Cl.
   *B65B 3/12*    (2006.01)
   *B65B 1/04*    (2006.01)
   (Continued)

(52) U.S. Cl.
   CPC .......... *B65B 3/12* (2013.01); *B05C 17/00593* (2013.01); *B65B 3/18* (2013.01);
   (Continued)

(58) Field of Classification Search
   CPC ........... B65B 3/12; B65B 13/12; B65B 31/00; B65B 17/00593; B65B 3/18; B65B 37/02
   See application file for complete search history.

(56) References Cited

U.S. PATENT DOCUMENTS

| | | |
|---|---|---|
| 4,840,293 A | 6/1989 | Segatz |
| 5,547,107 A | 8/1996 | Boiardi |
| | (Continued) | |

FOREIGN PATENT DOCUMENTS

| | | |
|---|---|---|
| DE | 3718948 A1 | 12/1988 |
| EP | 1270412 B1 | 9/2005 |
| | (Continued) | |

OTHER PUBLICATIONS

English translation of International Preliminary Report on Patentability dated Oct. 7, 2014 from related application No. PCT/JP2012/080786.
(Continued)

*Primary Examiner* — Jason K Niesz
(74) *Attorney, Agent, or Firm* — J-Tek Law PLLC; Jeffrey D. Tekanic; Scott T. Wakeman

(57) ABSTRACT

A method for transferring a viscous material from a container into a dispensing syringe having first and second ends, the second end being a discharge port smaller than the inner diameter of the main body portion, includes inserting into the syringe a plug configured to permit gas flow in only one direction to divide a chamber within the syringe into a first sub-chamber in communication with the discharge port and a second sub-chamber in communication with the first open end of the syringe. Then, a rod is inserted into the syringe from the first open end of the syringe to engage the plug, and the viscous material is extruded from the container and through the discharge port into the first sub-chamber of the syringe. While the first sub-chamber is being filled with the viscous material, the plug and the rod are moving away from the discharge port.

6 Claims, 16 Drawing Sheets

Related U.S. Application Data continuation of application No. 14/815,105, filed on Jul. 31, 2015, now Pat. No. 9,340,306, which is a continuation of application No. 13/501,750, filed as application No. PCT/JP2011/067971 on Aug. 5, 2011, now Pat. No. 9,126,702.

(51) Int. Cl.
    *B05C 17/005*     (2006.01)
    *B65B 31/00*     (2006.01)
    *B65B 3/18*     (2006.01)
    *B65B 13/12*     (2006.01)
    *F16N 37/02*     (2006.01)

(52) U.S. Cl.
    CPC .............. *B65B 13/12* (2013.01); *B65B 31/00* (2013.01); *F16N 37/02* (2013.01)

(56) References Cited

U.S. PATENT DOCUMENTS

| | | |
|---|---|---|
| 6,655,555 B1 | 12/2003 | Yankoglu et al. |
| 6,681,810 B2 | 1/2004 | Weston |
| 2009/0198182 A1 | 8/2009 | Fujishima et al. |
| 2011/0254187 A1 | 10/2011 | Mizoguchi et al. |
| 2012/0205001 A1 | 8/2012 | Mizoguchi et al. |
| 2015/0069091 A1 | 3/2015 | Mizoguchi et al. |
| 2016/0031123 A1 | 2/2016 | Mizoguchi et al. |

FOREIGN PATENT DOCUMENTS

| | | |
|---|---|---|
| EP | 2108599 A1 | 10/2009 |
| EP | 2108599 B1 | 12/2010 |
| FR | 1228986 A | 9/1960 |
| GB | 2071268 A | 9/1981 |
| JP | S60500045 | 1/1985 |
| JP | S61171565 A | 8/1986 |
| JP | S6333202 A | 2/1988 |
| JP | H05057870 | 3/1993 |
| JP | H05200343 A | 8/1993 |
| JP | 5254580 A | 10/1993 |
| JP | 642800 U | 6/1994 |
| JP | H06283856 A | 10/1994 |
| JP | H07106331 B2 | 11/1995 |
| JP | H081064 U | 7/1996 |
| JP | H11104404 A | 4/1999 |
| JP | 3073311 U | 11/2000 |
| JP | 2000317370 | 11/2000 |
| JP | 2000344282 A | 12/2000 |
| JP | 2002080005 A | 3/2002 |
| JP | 2003054694 A | 2/2003 |
| JP | 2004037935 A | 2/2004 |
| JP | 2004321985 A | 11/2004 |
| JP | 2010042361 A | 2/2010 |
| WO | 9849994 A | 11/1998 |
| WO | 2006003960 A1 | 1/2006 |
| WO | 2013150683 A1 | 10/2013 |

OTHER PUBLICATIONS

English translation of International Search Report dated Dec. 25, 2012 from related application No. PCT/JP2012/080786, including translation of examined claims 1-9.

English translation of International Search Report dated Nov. 8, 2011 from parent application No. PCT/JP2011/067971.

Extended European Search Report dated Apr. 10, 2014 in related European patent application No. 11819768, including European Search Opinion, Supplementary European Search Report and examined claims 1-8.

Extended European Search Report dated Aug. 4, 2016 in related European patent application No. 16164040, including European Search Opinion, European Search Report, and examined claims 1-4.

Japanese Office Action dated Jun. 19, 2012 for related application JP 2012-084358, including partial English translation thereof.

Japanese Office Action dated Oct. 19, 2010 for priority Japanese Patent Application No. 2010-187032, including English translation thereof.

Office Action from the Japanese Patent Office dated Jul. 31, 2018 in counterpart Japanese application No. 2017-169972, and machine translation thereof.

Search Report from the Japanese Patent Office dated Jul. 26, 2018 in counterpart Japanese application No. 2017-169972, and machine translation thereof.

| | |
|---|---|
| S1 | PREPARE VISCOUS MATERIAL |
| S11 | MIX |
| S12 | AGITATE AND DEGAS |
| S2 | FILL WITH VISCOUS MATERIAL |
| S21 | PREPARE CONTAINER SET |
| S22 | HOLD CONTAINER SET |
| S23 | PREPARE SYRINGE SET |
| S24 | HOLD SYRINGE SET |
| S25 | INSERT VACUUM TOOL |
| S26 | EVACUATE |
| S27 | EXTRUDE |
| S28 | ASSIST UPWARD DISPLACEMENT OF VACUUM TOOL |
| S29 | RETRACT VACUUM TOOL |
| S30 | REMOVE SYRINGE SET |
| S31 | REMOVE CONTAINER SET |

FIG.12

| S1 | PREPARE VISCOUS MATERIAL |
|---|---|
| S11 | MIX |
| S12 | AGITATE AND DEGAS |
| S2 | FILL WITH VISCOUS MATERIAL |
| S21 | PREPARE CONTAINER SET |
| S22 | HOLD CONTAINER SET |
| S23 | PREPARE SYRINGE SET |
| S24 | HOLD SYRINGE SET |
| S25 | INSERT ROD |
| S26 | EXTRUDE |
| S27 | ASSIST UPWARD DISPLACEMENT OF ROD |
| S28 | RETRACT ROD |
| S29 | REMOVE SYRINGE SET |
| S30 | REMOVE CONTAINER SET |

FIG.14

VISCOUS-MATERIAL FILLING METHOD

CROSS REFERENCE

This application is a continuation of U.S. patent application Ser. No. 15/097,746 filed Apr. 13, 2016, now pending, which is a continuation of U.S. patent application Ser. No. 14/815,105 filed on Jul. 31, 2015, now U.S. Pat. No. 9,340,306, which is a continuation of U.S. patent application Ser. No. 13/501,750 filed on Apr. 12, 2012, now U.S. Pat. No. 9,126,702, which is the US national stage of International Application PCT/JP2011/067971, filed on Aug. 5, 2011, which claims priority to Japanese patent application no. 2010-187032, filed on Aug. 24, 2010/

TECHNICAL FIELD

The invention relates to techniques of transferring and filling a viscous material from a container into a syringe, and more particularly to techniques of preventing the ingress of gas into the viscous material during the filling process.

BACKGROUND ART

It is known that viscous materials are utilized in some industries. Such applications include sealants for mechanical or electrical components, adhesives, pastes for use in forming electrical or electronic circuits, solders for use in mounting electronic components, etc. Such viscous materials are used in the aerospace industry, the electrical industry, the electronics industry, etc.

In some cases, a viscous material is transferred and filled from a container into a syringe, in order to improve the convenience of applying the viscous material to a target object. In these cases, during the filling process when the viscous material flows and is divided, it is possible that gases will be unintentionally entrapped in the viscous material. In addition, in case gases have been undesirably entrapped in the viscous material, there are the problems that the quantities of the viscous material intermittently dispensed from the syringe will undesirably vary with time, and that, at the ultimate stage when the viscous material is used after being cured, undesirable voids will be formed within the cured viscous material.

In an attempt to solve these problems, Japanese Patent Application Publication No. 2002-80005 discloses a prior-art technique of evacuating an air-tight chamber in which a container and a syringe are placed, to thereby evacuate the interiors of the container and the syringe, and extruding a viscous material from the container to the syringe by applying an external mechanical force to the viscous material within the container while the interiors are subjected to a vacuum.

SUMMARY OF THE INVENTION

However, the disclosed prior-art technique requires a filling device, which fills the syringe with the viscous material, to have an air-tight housing for holding both the container and the syringe, in order to prevent the ingress of gas into the viscous material during the filling process. For this reason, this prior-art technique tends to increase the required size of the filling device and the part count of the filling device; consequently, the required weight and cost of the filling device tend to increase.

Therefore, the invention has been created to provide techniques of transferring and filling a viscous material from a container into a syringe, without requiring the provision of a housing for holding both the container and the syringe in an air-tight manner, while preventing the ingress of gas into the viscous material during the filling the syringe with the viscous material.

According to one aspect of the present invention, a method is provided for transferring and filling a viscous material from a container into a syringe, comprising inserting a plunger into the container; inserting a first plug, which permits gas flow in one direction, into the syringe; connecting the container and the syringe with each other; inserting a rod into the syringe such that the rod engages with the first plug; and pushing the plunger within the container, thereby extruding the viscous material from the container and transfer and filling the extruded viscous material into the syringe.

According to the present invention, the following modes are provided. These modes will be stated below such that these modes are divided into sections and are numbered, and such that these modes depend upon other mode(s), where appropriate. This facilitates a better understanding of some of the plurality of technical features and the plurality of combinations thereof disclosed in this specification, and does not mean that the scope of these features and combinations should be interpreted to limit the scope of the following modes of the invention. That is to say, it should be interpreted that it is allowable to select the technical features, which are stated in this specification but which are not stated in the following modes, as technical features of the invention.

Furthermore, reciting herein each one of the selected modes of the invention in a dependent form so as to depend from the other mode(s) does not exclude the possibility of the technical features in the dependent-form mode from becoming independent of those in the corresponding dependent mode(s) and to be removed therefrom. It should be interpreted that the technical features in the dependent-form mode(s) may become independent according to the nature of the corresponding technical features, where appropriate.

(1) A method of transferring a viscous material from a container into a syringe for filling the syringe,
  wherein the container comprises:
  a container housing;
  a container inner chamber that is defined within the container housing for holding the viscous material; and
  first and second openings that are defined within the container housing in fluid communication with the container inner chamber, and
  the syringe comprises:
  a syringe housing;
  a syringe inner chamber that is defined within the syringe housing, into which the viscous material is to be transferred from the container for filing the syringe; and
  third and fourth openings that are defined within the syringe housing in fluid communication with the syringe inner chamber,
  the method comprising:
  inserting a plunger into the container through the first opening, with the container holding the viscous material, to thereby provide a container set to be held in position;
  inserting a first plug into the syringe so as to be in slidable contact with the syringe, to thereby provide a syringe set, the first plug within the syringe separating the syringe inner chamber into a first sub-chamber nearer to the third opening, and a second sub-chamber nearer to the fourth opening, the first plug permitting gas flow in a direction from the first sub-chamber to the second sub-chamber, preventing viscous-material flow in the same direction, and preventing gas and viscous-material flow in the reverse direction, the syringe set held in position with the third opening of the syringe removably coupled with the second opening of the container in a substantially air-tight manner;

inserting a rod into the syringe so that the rod engages with the first plug, to thereby apply a force to the first plug in a direction that allows the first plug to be displaced while reducing a volume of the first sub-chamber; and pushing the plunger within the container so as to move the plunger towards the second opening, to thereby extrude the viscous material from the container through the second opening, in order to transfer the viscous material from the container into the first sub-chamber of the syringe for filling the first sub-chamber.

According to this method, before the syringe is filled with the viscous material, when the viscous material flows in the first sub-chamber of the syringe from the container, the viscous material compresses a gas confined in the first sub-chamber, creating a pressure differential between the first sub-chamber and the second sub-chamber within the syringe, such that the first sub-chamber is higher in pressure than the second sub-chamber that is in communication with outside of the syringe. The pressure differential allows the gas within the first sub-chamber to flow in the second sub-chamber via a radial clearance between an inner circumferential surface of the syringe and an outer circumferential surface of the first plug, and eventually, the gas is released from the syringe through its fourth opening.

As a result, according to this method, during the process of filling the first sub-chamber with the viscous material, as more viscous material is filling the first sub-chamber, more gas is released from the first sub-chamber, preventing the viscous material within the first sub-chamber from trapping gas.

Further, according to this method, a force is applied to the first plug within the syringe in a direction that allows the first plug to be displaced while reducing the volume of the first sub-chamber. The applied force displaces the first plug towards the viscous material held within the syringe, in other words, the applied force compresses the first sub-chamber.

For these reasons, according to this method, the abovementioned pressure differential is also created by applying the aforementioned force to the first plug by the rod; therefore a larger amount of the pressure differential is created than if no force were applied to the first plug by the rod. Gas flow is facilitated in the direction from the first sub-chamber into the second sub-chamber through the radial clearance formed between the inner circumferential surface of the syringe and the outer circumferential surface of the first plug.

Thus, according to this method, for transferring a viscous material from a container into a syringe for filling the syringe, while preventing the viscous material from trapping gases, there is no need to evacuate the inner chambers within the container and the syringe (especially an inner chamber within the syringe). As a result, ingress of gases into the viscous material is prevented during the process of filling the syringe with the viscous material, without requiring provision of an air-tight housing for holding both the container and the syringe.

It is noted that the method according to this mode may be performed in a manner in which, after completing the container set by inserting the plunger into the container, the container set is placed and held in position, or in a manner in which, after placing and holding only the container in position, the container set is completed by inserting the plunger into the container held in position.

Similarly, this method may be also performed in a manner in which, after completing the syringe set by inserting the first plug into the syringe, the syringe set is placed and held in position, or in a manner in which, after placing and holding only the syringe in position, the syringe set is completed by inserting the first plug into the syringe held in position.

(2) The method according to mode (1), further comprising holding the container set in an inverted orientation in which the first opening is located below the second opening, wherein the pushing is performed to downwardly push the plunger so as to move the plunger towards the second opening of the container, to thereby transfer the viscous material from the container to the first sub-chamber of the syringe, in an opposite direction to gravity, for filling the syringe.

(3) The method according to mode (2), further comprising assisting in producing upward displacement of the rod within the syringe such that the rod moves together with the first plug that moves upward as more viscous material is filling the first sub-chamber, by applying an upward force to the rod.

(4) The method according to any one of modes (1)-(3), wherein the syringe has an inner circumferential surface that has a circular cross-section and defines the syringe inner chamber, the first plug is made by molding an elastically deformable material for forming a cup shape, to thereby provide the first plug with a silhouette of a circle having an outer diameter substantially equal to an inner diameter of the inner circumferential surface, the first plug has a forward end portion and a rearward end portion, the method further comprising inserting the first plug into the syringe, with the forward end portion located within the inner circumferential surface, and facing the third opening, and with the rearward end portion in contact with the inner circumferential surface.

(5) The method according to any one of modes (1)-(4), wherein the rod is a vacuum tube that can axially transmit a compressive force via the vacuum tube, the vacuum tube is equipped with a second plug so as to extend through the second plug in a substantially air-tight manner, the second plug introduced into the syringe, the second plug, when placed within the syringe, separates the second sub-chamber into a third sub-chamber nearer to the first plug, and a fourth sub-chamber nearer to the fourth opening, the second plug prevents both a first gas flow from the third sub-chamber towards the fourth sub-chamber and a second gas flow that is a reverse gas flow to the first gas flow, or only the second gas flow, the vacuum tube, when placed within the syringe, is in fluid communication with the third sub-chamber, and the inserting a rod is performed to introduce the vacuum tube and the second plug into the syringe, with the second plug in slidable contact with the inner circumferential surface of the syringe, the method further comprising withdrawing gas from the third sub-chamber via the vacuum tube, to thereby evacuate the third sub-chamber and therefore the first sub-chamber.

According to this method, owing to the vacuum tube (e.g., which has its near end at which the vacuum tube is in communication with the first sub-chamber, and its far end at which the vacuum tube is in communication with a first vacuum source located outside), the third sub-chamber is evacuated, and subsequently, the third sub-chamber serves as a second vacuum source to evacuate the first sub-chamber because of a gas flow via a radial clearance between the syringe and the first plug.

Because of this, a pressure differential is created between the first sub-chamber and the third sub-chamber within the syringe, and the first vacuum source in communication with the far end of the vacuum tube, such that the first sub-chamber and the third sub-chamber are higher in pressure than the first vacuum source. The pressure differential allows gas flow from the first sub-chamber into the third sub-chamber via a radial clearance between the inner circumferential surface of the syringe and the outer circumferential surface of the first plug, and eventually the gas is discharged to outside of the syringe via the vacuum tube. As a result, no gas is entrapped in the viscous material while the viscous material is entering the first sub-chamber.

Consequently, according to this method, creation of a vacuum only in the syringe prevents the viscous material held in the syringe from contacting gas, and therefore, no gas is entrapped in the viscous material while the viscous material is entering the syringe, without requiring provision of an air-tight housing for holding both the container and the syringe.

Further, according to this method, because the first sub-chamber that will be filled with the viscous material is evacuated, in case gases are entrapped in the viscous material before the viscous material enters the syringe, the viscous material will be also degassed, that is, the gasses will be released from the viscous material while the viscous material is entering the syringe.

Still further, according to this method, a force is applied to the first plug within the syringe by the vacuum tube in a direction such that, when the first plug is displaced by the force, the first plug moves towards the viscous material held in the syringe (i.e., a force acting from the fourth opening towards the third opening). The applied force has a direction that allows the first plug to be displaced while reducing the volume of the first sub-chamber. In addition, the evacuation of the first sub-chamber also facilitates a reduction in the volume of the first sub-chamber.

Therefore, according to this method, the application of the force by the vacuum tube and the creation of a vacuum within the first sub-chamber together cooperate to facilitate gas release from the first sub-chamber via the radial clearance between the syringe and the first plug.

(6) The method according to mode (5), wherein the second plug has substantially the same shape as that of the first plug, and the inserting a rod is performed to introduce the second plug into the syringe, with the second plug and the first plug arranged in a serial array in the same orientation.

(7) An apparatus of transferring a viscous material from a container into a syringe for filling the syringe, wherein the container comprises:
a container housing;
a container inner chamber formed within the container housing for holding the viscous material; and
first and second openings formed in the container housing in fluid communication with the container inner chamber, and
the syringe comprises:
a syringe housing;
a syringe inner chamber formed within the syringe housing, into which the viscous material is to be transferred from the container for filing the syringe; and third and fourth openings formed in the syringe housing in fluid communication with the syringe inner chamber,
the apparatus further comprising:
a container set holder for holding a container set in position, the container set provided by inserting a plunger into the container through the first opening, with the container holding the viscous material;
a syringe set holder for holding a syringe set with the third opening of the syringe removably coupled with the second opening of the container in a substantially air-tight manner, the syringe set provided by inserting a first plug into the syringe in slidable contact with the syringe, the first plug within the syringe separating the syringe inner chamber into a first sub-chamber nearer to the third opening, and a second sub-chamber nearer to the fourth opening, the first plug permitting gas flow in a direction from the first sub-chamber to the second sub-chamber, preventing viscous-material flow in the same direction, and preventing gas and viscous-material flow in the reverse direction;
a rod located within the syringe so that the rod engages with the first plug, to thereby apply a force to the first plug in a direction that allows the first plug to move while reducing a volume of the first sub-chamber; and
a pushing unit for pushing the plunger within the container so as to move the plunger towards the second opening, to thereby extrude the viscous material from the container through the second opening, in order to transfer the viscous material from the container into the first sub-chamber of the syringe for filling the first sub-chamber.

(8) A method of holding in a container a viscous material to be degassed, and turning the container under a vacuum using a mixer, to thereby agitate the viscous material while degassing the viscous material, the method comprising:

setting a turning speed at which the mixer turns the container and a length of an agitating time during which the mixer continuously agitates the viscous material within the container, so as to minimize that sizes and/or number of voids finally remaining within the viscous material and a temperature rise of the viscous material caused by the agitating/degassing operation; and simultaneously agitating and degassing the viscous material within the container, by operating the mixer to orbit the container around an orbital axis and simultaneously rotating the container about a rotational axis that is eccentric to the orbital axis, with the container filled with the viscous material under a vacuum, so that the set values of the turning speed and the agitating time can be reached.

(9) A container set for containing a viscous material so that a desired quantity of a dose of the viscous material can be dispensed, comprising:

a container having a longitudinal inner circumferential surface that defines a chamber for holding the viscous material; and a plunger having a longitudinal outer circumferential surface that is axially slidably fitted into the inner circumferential surface of the container, wherein the plunger has a tip end portion and a base end portion so as to be coaxial with each other in a linear array, the plunger configured to allow the plunger to be inserted into the container, such that the tip end portion is first fitted into the inner circumferential surface of the container, and the base end portion is next fitted into the inner circumferential surface of the container.

BRIEF DESCRIPTION OF THE DRAWINGS

FIG. 12 is a process flowchart illustrating the filling method, along with a viscous-material preparation method performed prior to the filling method.

FIG. 14 is a process flowchart illustrating the filling method according to the second embodiment, along with a viscous-material preparation method performed prior to the filling method.

EMBODIMENTS FOR CARRYING OUT THE INVENTION

Some of the more specific embodiments of the invention will be described in the following in more detail with reference to the drawings.

Figure 1:
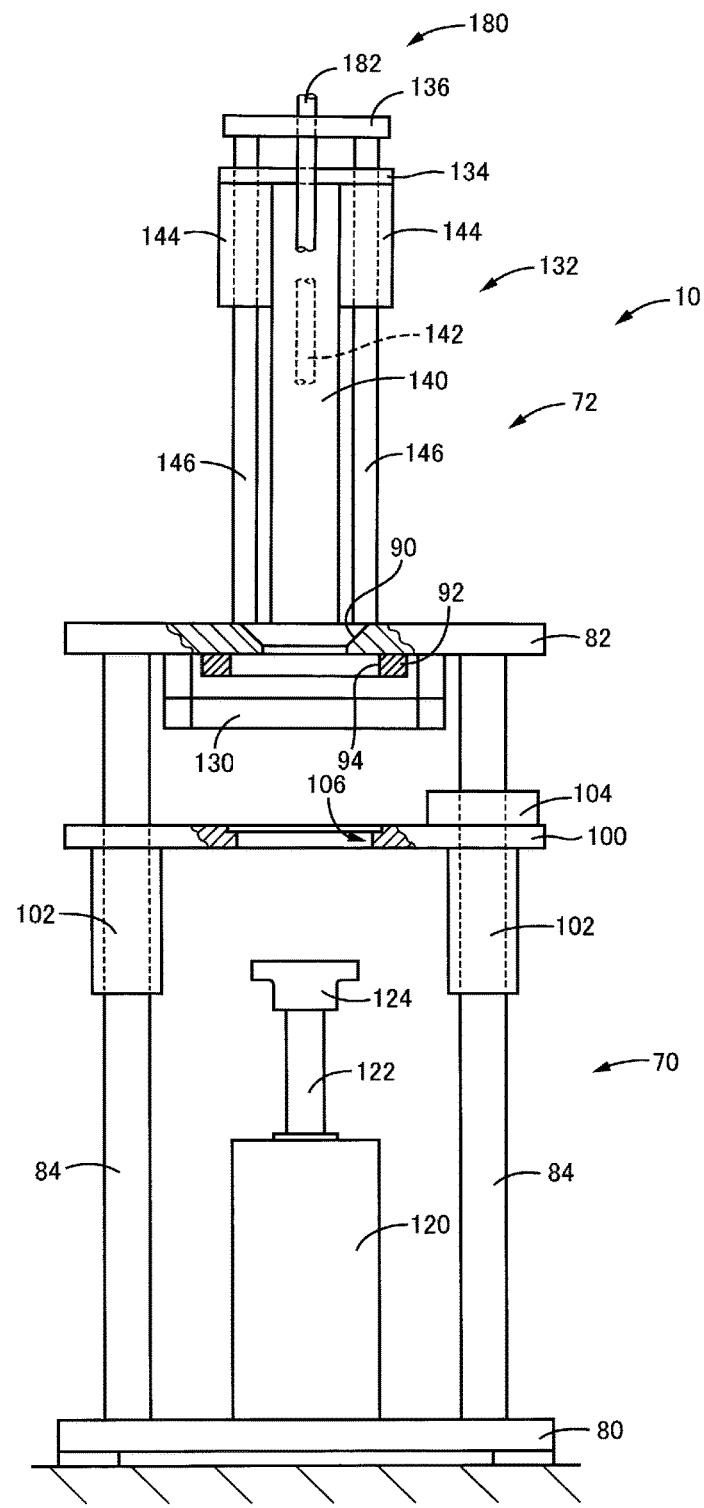
FIG. 1 is a cutaway cross-sectional front view illustrating a viscous-material filling device (hereinafter, referred to simply as "filling device") that is suitable for use in performing a viscous-material filling method (hereinafter, referred to simply as "filling method") according to a first embodiment of the invention.
Figure 2:
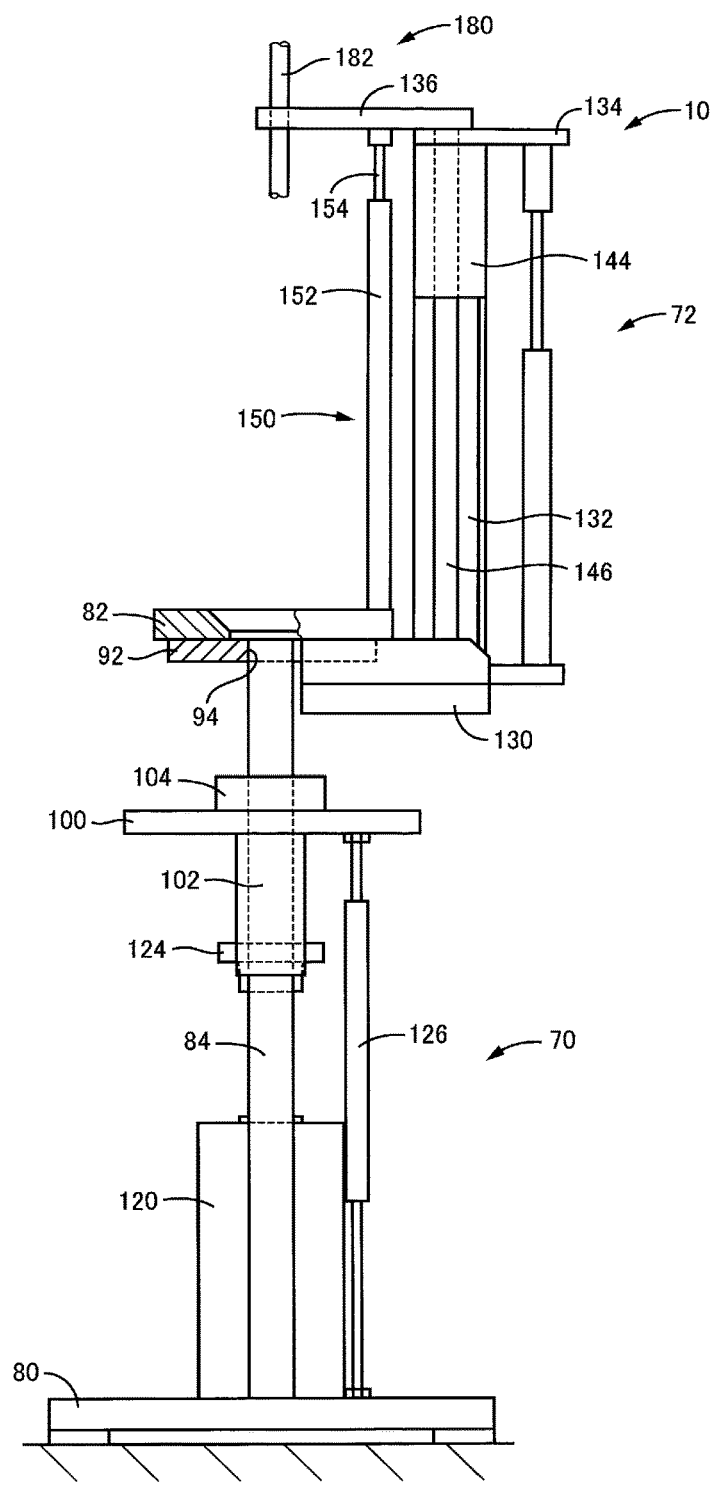
FIG. 2 is a cutaway cross-sectional side view illustrating the filling device depicted in FIG. 1.
Figure 3:
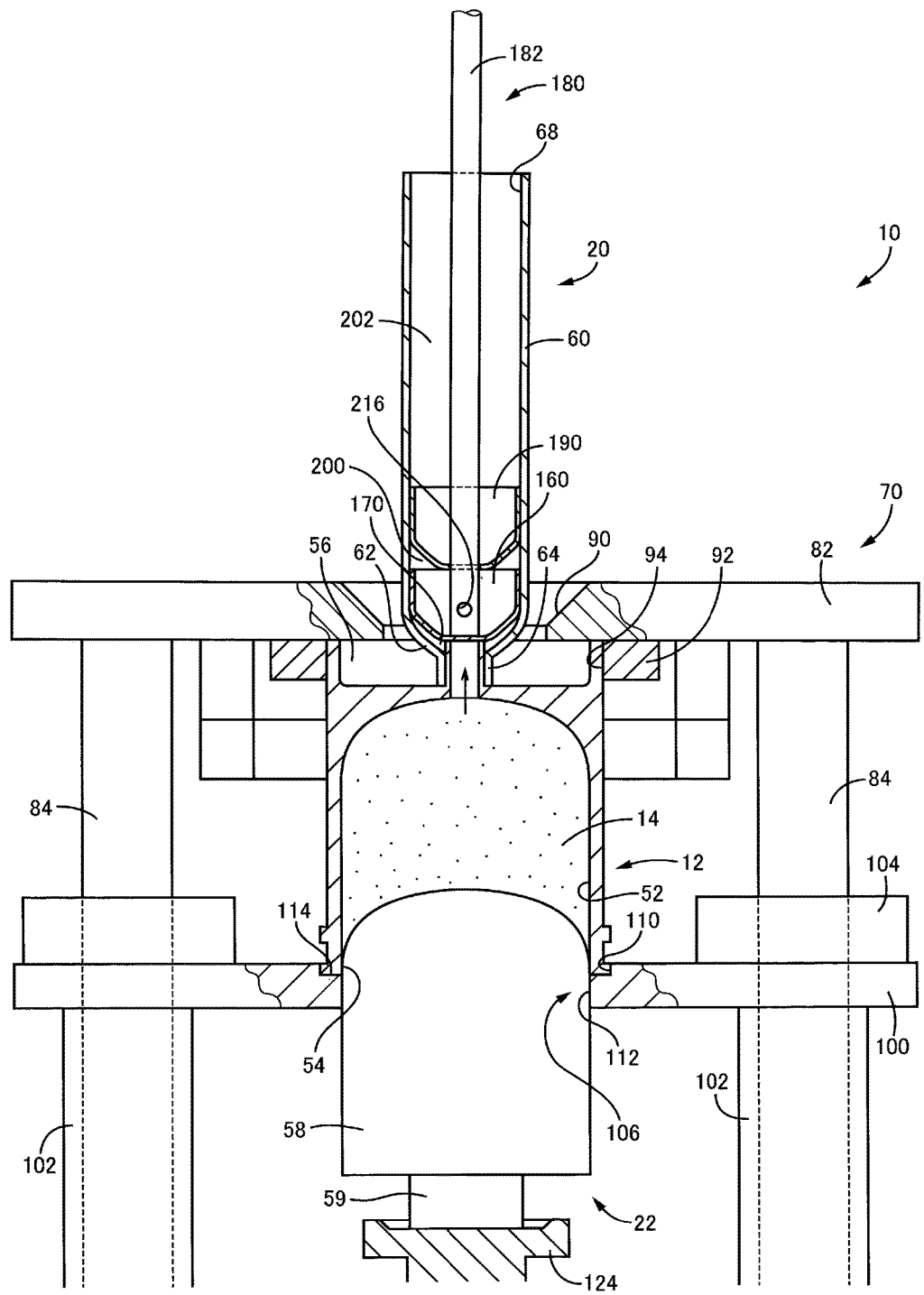
FIG. 3 is an enlarged cutaway cross-sectional front view illustrating a relevant portion of the filling device depicted in FIG. 1, when in use.

FIG. 1 illustrates a viscous-material filling device (hereinafter, referred to simply as "filling device") 10 in a cutaway cross-sectional front view, which is configured to be suitable for use in performing a viscous-material filling method (hereinafter, referred to simply as "filling method") according to a first embodiment of the invention, and FIG. 2 illustrates the filling device 10 in a cutaway cross-sectional side view. FIG. 3 illustrates a relevant portion of the filling device 10, when in use, in an enlarged cutaway cross-sectional front view.

The filling method is performed to transfer a viscous material 14, which is contained within a container 12, from the container 12 into, and to fill, a syringe 20 (i.e., a smaller container that divides the viscous material 14 into smaller amounts, which is also referred to as "dispensing syringe"). The viscous material 14 in the container 12 is extruded from the container 12 by pushing a plunger 22 into the container 12. The syringe 20 is filled with the extruded viscous material 14 while under a vacuum. The viscous material 14 has a viscosity of, for example, about 1,100 Pa·s or about 11,100 poise.

Figure 4A:
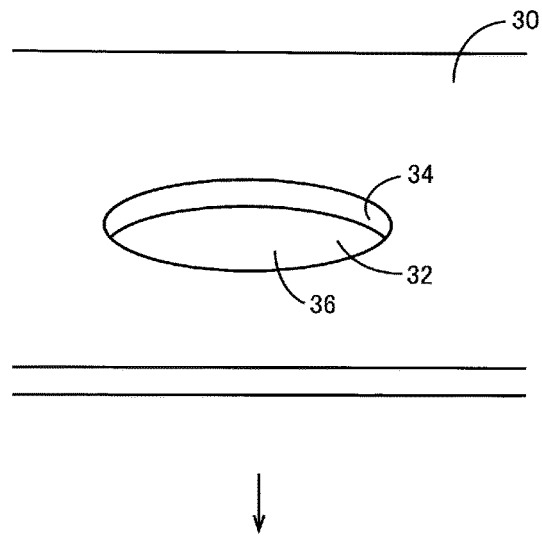
FIGS. 4A, 4B and 4C are perspective views for explaining an exemplary use of a sealant, which is an exemplary viscous material that fills a syringe using the filling device depicted in FIG. 1.

An example of the viscous material 14 is a high-viscosity, electrically non-conductive sealant; an example of the use of such a sealant is in aircrafts. For example, in aircrafts nowadays, a metal (or electrically conductive) rivet 32 is inserted into a through bore 34 formed in the panel 30 with a tapered section, as illustrated in FIG. 4A, and is then upset, for the purpose of joining an electrically non-conductive panel 30, which constitutes an outer panel thereof, to an inner frame (not shown).

Figure 4B:
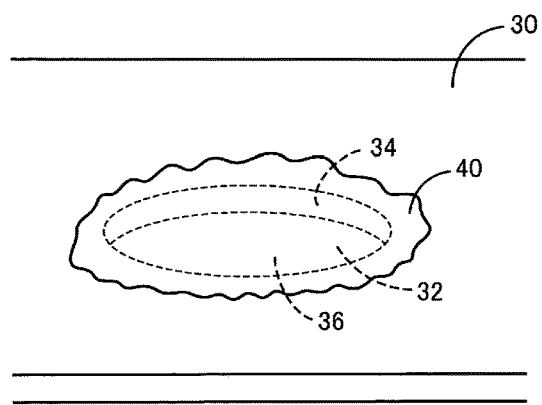

Next, an electrically non-conductive sealant 40 is applied onto the surface the head 36, as illustrated in FIG. 4B, so that the dish-shaped head 36 of the upset rivet 32 is not exposed. At this time, a portion of the sealant 40 upwardly projects from the surface of the panel 30.

Figure 4C:
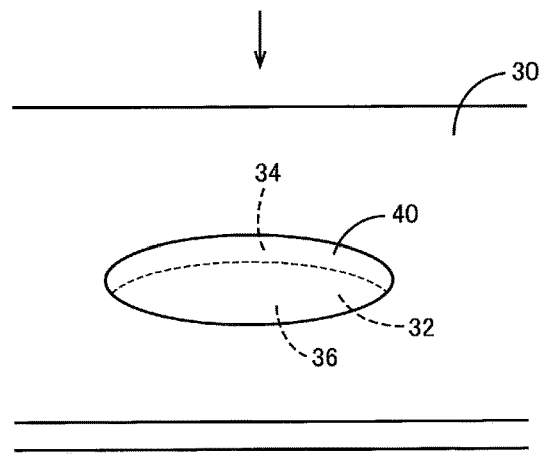

Then, the portion of the sealant 40 that upwardly projects from the surface of the panel 30 is shaved off by an operator, as illustrated in FIG. 4C, to shape the surface of the sealant 40, and the surface of the sealant 40 is made flush with the surface of the panel 30. Thereafter, the surface of the panel 30 and the surface of the sealant 40 are painted with the same paint.

An example of the syringe 20 is a cartridge that is removably attached to a dispenser gun (not shown). An example of such a dispenser gun is disclosed in U.S. Pat. No. 7,690,530, the content of which is incorporated herein by reference in its entirety.

Once the cartridge (i.e. the syringe 20), which has been filled with the viscous material 14, has been loaded into the dispenser gun, the viscous material 14 is dispensed by the dispenser gun from the cartridge in the required amount and is applied to a target object (e.g., the above-mentioned rivet 32). In other words, in the present embodiment, the syringe 20 and a below-described first plug are used to both fill and apply the viscous material 14.

Figure 5:
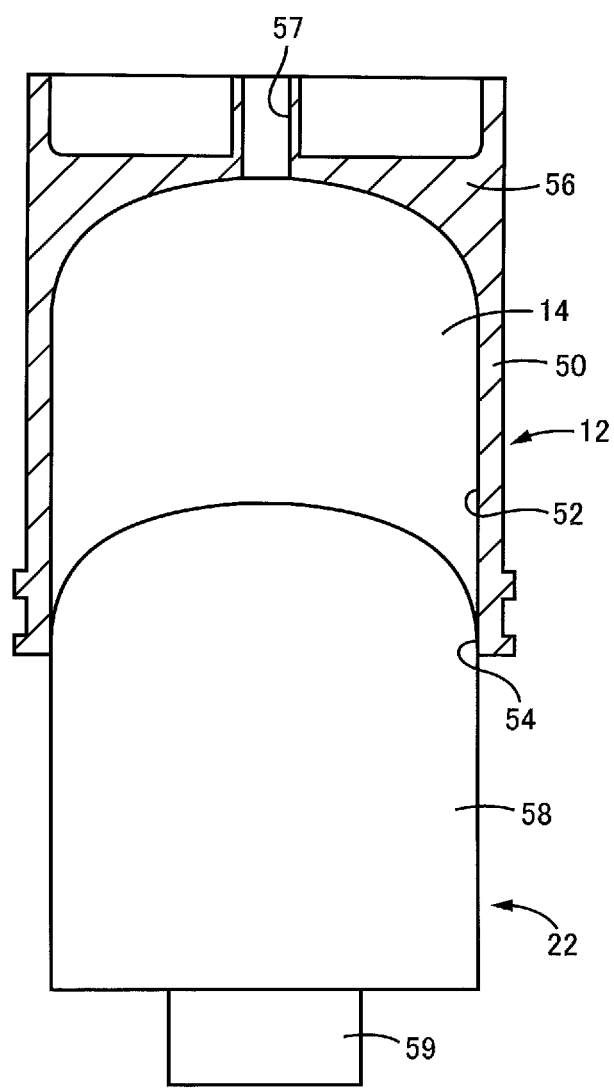
FIG. 5 is an enlarged cutaway cross-sectional side view illustrating the container set depicted in FIG. 3 that is constructed by inserting a plunger into a container.

In FIG. 5, the container 12 is illustrated in a cross-sectional side view. In the present embodiment, the same container 12 is used for the production of the viscous material 14 (two-component mixing, as described below), the degassing of the viscous material 14 (centrifugal vacuum degassing using a mixer, as described below) after the production thereof, and the storage and transportation of the viscous material 14 prior to filling into the syringe 20.

As illustrated in FIG. 5, the container 12 has a longitudinally-extending hollow housing 50 (an example of the aforementioned container housing) and a cylindrical chamber 52 (an example of the aforementioned container inner chamber) that is formed coaxially within the housing 50. The chamber 52 has an opening 54 (an example of the aforementioned first opening) and a base portion 56. The base portion 56 has a recess that forms a generally hemispherical shape. Because the base portion 56 has a continuous shape, the viscous material 14 flows in the chamber 52 more smoothly than if the base portion 56 had a flat shape;

as a result, the mixing efficiency of the viscous material 14 is improved. An example of a material constituting the container 12 is POM (polyacetal); another example is Teflon (registered trademark), although these are not limiting.

In the base portion 56 of the chamber 52, a discharge passage 57 (an example of the aforementioned second opening) is formed for discharging the viscous material 14 (a mixture of Solutions A and B), which is contained within the chamber 52, into the syringe 20; the discharge passage 57 is selectively closed by a removable plug (not shown).

As illustrated in FIG. 5, the plunger 22 is pushed into the chamber 52 of the container 12 in order to discharge the viscous material 14 from the container 12. The plunger 22 has a main body portion 58 and an engagement portion 59 formed at the rear end of the main body portion 58. The main body portion 58 has an exterior shape that is complementary to the interior shape of the chamber 52 of the container 12 (e.g., an exterior shape having a protrusion that forms a generally hemispherical shape). The engagement portion 59 is smaller in diameter than the main body portion 58; when an external force is loaded by the filling device 10, the plunger 22 advances. As the plunger 22 moves within the chamber 52 closer to the discharge passage 57, viscous material 14 is extruded from the discharge passage 57.

Figure 6:
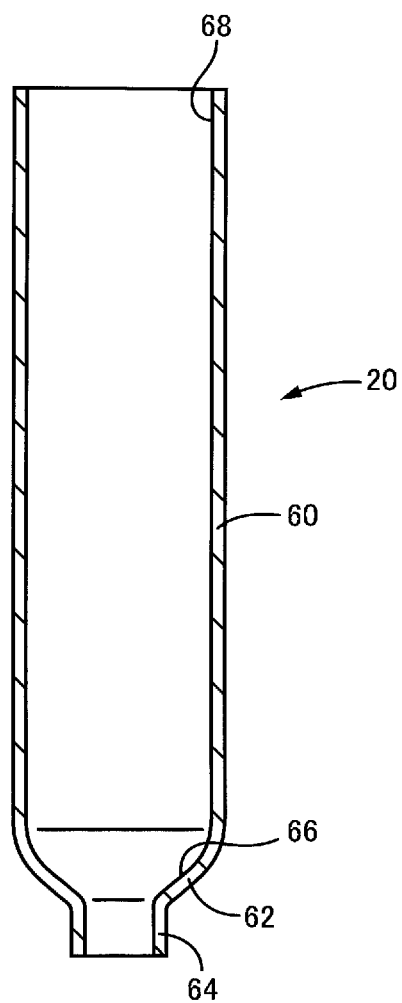
FIG. 6 is an enlarged cross-sectional side view illustrating the syringe depicted in FIG. 3.

In FIG. 6, the syringe 20 is illustrated in a cross-sectional side view. The syringe 20 has a coaxial, cylindrical main body portion 60, which extends longitudinally with a uniform cross section, and a hollow base portion 62, which is connected at one of its two ends with the main body portion 60. The base portion 62 has a tubular portion 64 (an example of the aforementioned third opening) at its tip end, which is smaller in diameter than the main body portion 60; on the other side that connects with the main body portion 60, the base portion 62 has a tapering tapered portion 66. The opposite end of the main body portion 60 has an opening 96 (an example of the aforementioned fourth opening). An example of a material constituting the syringe 20 is POM (polyacetal), but this is not limiting.

In the present embodiment, the viscous material 14 is filled from the container 12 into the syringe 20 by passing through the tubular portion 64 located at one of the two ends of syringe 20; after completion of the filling, to dispense the viscous material 14 for use, the viscous material 14 is discharged from the syringe 20 by passing through the same passage, i.e. the tubular portion 64 (the smallest diameter passage of the syringe 20). In other words, the flow of the viscous material 14 into and out of the syringe 20 is carried out by passing through the same smallest-diameter passage.

In the present embodiment, while transferring the viscous material 14 from the container 12 to the syringe 20, the container 12 is held in space, as illustrated in FIG. 5, such that the container 12 is oriented with the opening 54 of the chamber 52 facing downward and the discharge passage 57 of the base portion 56 facing upward (upside-down position). In this state, the plunger 22 is moved upwardly within the chamber 52. As a result, the viscous material 14 is upwardly extruded from the chamber 52.

Furthermore, while transferring the viscous material 14 from the container 12 to the syringe 20, the syringe 20 is held in space with the opening 68 facing upward and with the base portion 62 facing downward. In this state, when the viscous material 14 is upwardly extruded from the container 12, it is injected via the base portion 62 of the syringe 20.

As a result, the viscous material 14 increasingly accumulates in the syringe 20 via the base portion 62 (lower portion), such that the uppermost level of the viscous material 14 rises in the direction from the base portion 62 to the opening 68 (upper portion).

Thus, in the present embodiment, when the viscous material 14 is injected into the syringe 20 by injecting via the lower portion of the syringe 20, the new viscous material 14 does not splash onto the previously accumulated portion, unlike the case of injecting via the upper portion, in which the new viscous material 14 drops due to its weight. As a result, when the viscous material 14 is injected into the syringe 20, it is less likely that voids will form in the viscous material 14 accumulated in the syringe 20, than if the viscous material 14 were to be injected via the upper portion of the syringe 20.

As illustrated in FIGS. 1 and 2, the filling device 10 has a container holder mechanism 70 (an example of the aforementioned container set holder) at its lower portion that removably holds the container 12; on the other side, the filling device 10 has a syringe holder mechanism 72 (an example of the aforementioned syringe set holder) at its upper portion that removably holds the syringe 20.

The container holder mechanism 70 has a base plate 80, which sits on the ground, a top plate 82, which is not vertically movable and is located above the base plate 80, and a plurality of vertical parallel shafts 84, each of which is fixedly secured at its two ends to the base plate 80 and the top plate 82 (in the present embodiment, two shafts disposed symmetrically relative to a vertical centerline of the container holder mechanism 70). The top plate 82 has a through hole 90. The through hole 90 is coaxial with the vertical centerline of the container holder mechanism 70.

A guide plate 92 is fixedly secured to a lower face of the top plate 82. The guide plate 92 has a guide hole 94 coaxial with the through hole 90. The guide hole 94 penetrates through the guide plate 92 in the thickness direction with a uniform cross-section. The guide hole 94, as illustrated in FIG. 3, has an inner diameter that is slightly larger than the outer diameter of the base portion 56 of the container 12, and it is possible to fit the container 12 within the guide hole 94 without any noticeable play. Due to the guide hole 94, the container 12 is aligned relative to the top plate 82 in the horizontal direction (the radial direction of the container 12).

As illustrated in FIG. 3, when the base portion 56 of the container 12 is in the state that it is fitted in the guide hole 94, the container 12 abuts on the lower surface of the top plate 82 at a tip end surface of the base portion 56 (in the same plane). As a result, the container 12 can be aligned relative to the top plate 82 in the vertical direction (the axial direction of the container 12).

As illustrated in FIGS. 1 and 2, the container holder mechanism 70 further has a vertically movable plate 100. The movable plate 100 has a plurality of sleeves 102, into which the shafts 82 are axially slidably fitted. By manipulating a lock mechanism 104, the operator can move the movable plate 100 and stop the movement in any position in the vertical direction.

The movable plate 100 has a stepped positioning hole 106 coaxial with the guide hole 94. The positioning hole 106 penetrates through the movable plate 100 in the thickness direction. The positioning hole 106 has a larger-diameter hole 110 on the side closer to the guide hole 94, a smaller-diameter hole 112 on the opposite side, and a shoulder surface 114 between the larger-diameter hole 110 and the smaller-diameter hole 112 and facing towards the guide hole 94.

The larger-diameter hole 110 has an inner diameter that is slightly larger than the outer diameter of the opening 54 of the container 12 and the container 12 is aligned relative to the movable plate 100 (and therefore relative to the top plate 82) in the horizontal direction (the radial direction of the container 12).

The tip end surface of the opening 54 of the container 12 (in the same flat plane) abuts on the shoulder face 114, and the container 12 is aligned relative to the movable plate 100 (and therefore relative to the top plate 82) in the vertical direction (the axial direction of the container 12).

The smaller-diameter hole 112 has an inner diameter that is slightly larger than the outer diameter of the plunger 22, and the plunger 22 is slidably fitted into the smaller-diameter hole 112. The smaller-diameter hole 112 serves as a guide hole for guiding axial movement of the plunger 22.

A container set is constructed by inserting the plunger 22 into the container 12, and the container set is attached to the top plate 82, with the movable plate 100 sufficiently spaced from the top plate 82 in the downward direction. Thereafter, the movable plate 100 is upwardly moved until the tip end face of the opening 54 of the container 12 abuts on the shoulder face 114. At this position, the movable plate 100 is fixedly secured to the shafts 84. As a result, the retention of the container set on the container holder mechanism 70 is completed.

As illustrated in FIGS. 1 and 2, the container holder mechanism 70 further has an air cylinder 120 (an example of the aforementioned pushing unit) serving as an actuator and coaxial with the guide hole 94. A rod 122, which serves as a vertically movable member, upwardly projects from the air cylinder 120, and a pusher 124 is affixed at the tip end of the rod 122. The pusher 124, as illustrated in FIG. 3, engages with the engagement portion 59 of the plunger 22 of the container set that is held in the container holder mechanism 70. In the engagement position, as the pusher 124 advances, the plunger 22 advances relative to the container 12 so as to reduce the volume of the chamber 52.

The air cylinder 120is double-acting and, based on the operator' actions, the piston 124 thereof selectively advances from an initial position to an active position (upward movement by pressurization), retreats from the active position to an inactive position (downward movement by pressurization), and stops at any desired position (from both gas chambers within the air cylinder 120). Although not illustrated, the air cylinder 120 is connected to a high-pressure source (its primary pressure is, e.g., 0.2 MPa) via a hydraulic pressure control unit having flow control valve(s).

As illustrated in FIG. 2, the container holder mechanism 70 further has a gas spring 126 serving as a damper. The gas spring 126 extends vertically and is pivotably coupled at its two ends with the base plate 80 and the movable plate 100, respectively. The gas spring 126 is provided to restrict the downward movement of the movable frame 100 due to gravity when the lock mechanism 104 is in an unlocked position.

As illustrated in FIGS. 1 and 2, the syringe holder mechanism 72 is equipped with abase frame 130 that is fixedly secured to the top plate 82, an air cylinder 132 serving as an actuator, a top frame 134 and a movable frame 136.

The air cylinder 132 has a vertically-extending main body 140, which is fixedly secured to the top plate 82 and the top frame 134, and a vertically-moving rod 142 that is linearly movable relative to the main body 140. The upper end of the vertically-moving rod 142 (the end of the vertically-moving rod 142 that projects from the main body 140) is fixedly secured to the movable frame 136.

The air cylinder 132 is double acting, and based on operator's actions, the vertically-moving rod 142 thereof selectively advances from an initial position to an active position (upward movement by pressurization), retreats from the active position to an inactive position (downward movement by pressurization), and floats at any desired position (permitting exhaust from both gas chambers in the air cylinder 132). That is, the air cylinder 132 can selectively switch between an advanced mode, a retracted mode and a floating mode. Although not illustrated, the air cylinder 132 is connected to a high pressure source via a hydraulic pressure control unit.

A plurality of sleeves 144 (in the present embodiment, two parallel sleeves disposed symmetrically with the air cylinder 132 interposed therebetween) are fixedly secured to the main body 140. A plurality of vertically-extending shafts 146 are slidably fitted into the respective sleeves 144. The upper end portion of each shaft 146 is fixedly secured to the movable frame 136.

Each of the base frame 130, the top frame 134, the main body 140 and the sleeves 144 is a stationary member in the syringe holder mechanism 72, while the movable frame 136, the vertically-movable member 142, and the shafts 146 are each movable members that vertically move in unison.

As illustrated in FIG. 2, the syringe holder mechanism 72 is further equipped with a gas spring 150 serving as a damper. The gas spring 150 extends vertically between the base frame 130 and the movable frame 136. The gas spring 150 is equipped with a cylinder 152 having a gas chamber (not shown), and a rod 154 that is extendable and retractable relative to the cylinder 152. At one end thereof, it is pivotably coupled to the base frame 130.

A tip end of the rod 154 detachably engages a lower surface of the movable frame 136. As a result, although the movable frame 136 can compress the rod 154, it cannot extend the rod 154. When in a compressed state, the rod 154 applies an upward force against the movable frame 136, which assists the upward movement of the movable frame 136.

Figure 7:
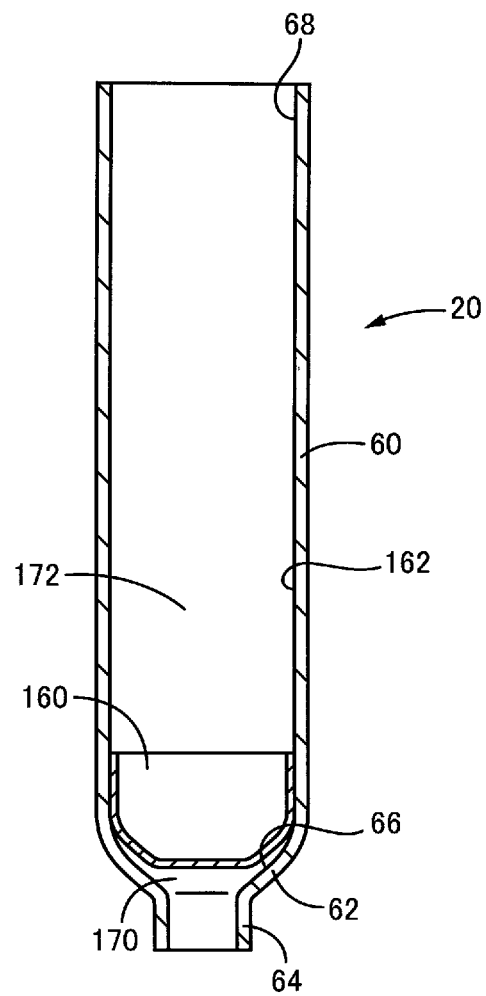
FIG. 7 is an enlarged cross-sectional side view illustrating the syringe set depicted in FIG. 3, which is constructed by inserting a first plug into the syringe.
Figure 8:
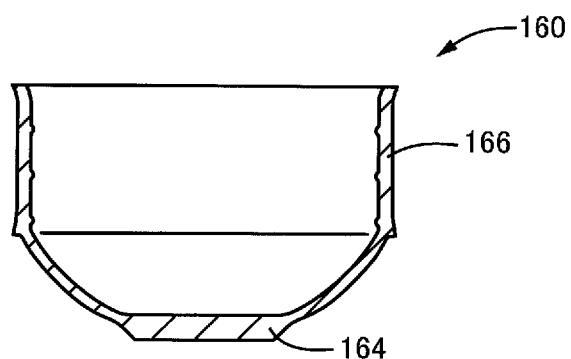
FIG. 8 is a cross-sectional side view illustrating the first plug depicted in FIG. 7.

As illustrated in FIG. 7, the un-filled syringe 20 is held by the syringe holder mechanism 72 with a first plug 160 inserted in the syringe 20. As illustrated in FIG. 8, the first plug 160 is made by molding an elastically deformable material (e.g., PP) into a cup shape. The first plug 160 has a silhouette of a circle having an outer diameter that is substantially equal to an inner diameter of the inner circumferential surface 162 (see FIG. 7) of the syringe 20.

The first plug 160 has an anterior end portion 164 and a posterior end portion 166. The first plug 160 is inserted into the syringe 20, with the anterior end portion 164 facing towards the base portion 62 of the syringe 20, and with the posterior end portion 166 contacting the inner circumferential surface 162 of the syringe 20. A syringe set is provided by inserting the first plug 160 into the syringe 20. By inserting the first plug 160 into the syringe 20 in the proximity of the base portion 62, a chamber within the syringe 20 is divided into a first sub-chamber 170, which is closer to the base portion 62, and a second sub-chamber 172, which is closer to the opening 68.

The first plug 160, when inserted in the syringe 20, provides a non-return function for gas (typically, air).

More specifically, within the syringe 20, when the first sub-chamber 170 is at a higher air pressure than the second sub-chamber 172, air flow is permitted from the first sub-chamber 170 to the second sub-chamber 172 via a clearance existing between the inner circumferential surface 162 and an outer circumferential surface of the first plug 160. In contrast, when the first sub-chamber 170 is at a lower air pressure than the second sub-chamber 172, this pressure differential causes the inner circumferential surface 162 of the syringe 20 and the outer circumferential surface of the first plug 160 to be brought into air-tight contact with each other, resulting in the blockage of air flow from the second sub-chamber 172 to the first sub-chamber 170.

Therefore, due to the non-return function provided by the first plug 160, the creation of a vacuum in the second sub-chamber 172 leads to the creation of a vacuum in the first sub-chamber 170; thereafter, even if the pressure of the second sub-chamber 172 returns to atmospheric pressure, the first sub-chamber 170 is maintained at a vacuum.

In addition, the first plug 160 provides a large resistance to the flow of viscous material 14 through the clearance between the inner circumferential surface 162 and the outer circumferential surface of the first plug 160, due to the viscosity of the viscous material 14. As a result, the flow of viscous material 14 from the first sub-chamber 170 to the second sub-chamber 172 is either completely blocked, or even if not completely blocked, then effectively blocked. In addition, the flow of viscous material 14 from the second sub-chamber 172 to the first sub-chamber 170 is completely blocked. Therefore, due to the first plug 160, the viscous material 14 can be stored in the first sub-chamber 170 without leakage of the viscous material 14 to the second sub-chamber 172.

In the present embodiment, after the viscous material 14 has been filled into the syringe 20, the first plug 160 provides the function of preventing leakage of the viscous material 14 from the syringe 20. Incidentally, the syringe 20 that has been filled with the viscous material 14 is then loaded into the aforementioned dispenser gun as the aforementioned cartridge. When a trigger is pulled by the operator, the dispenser gun dispenses the viscous material 14 from the aforementioned cartridge, only in the necessary amount for the sealant, by pushing out the first plug 160. Therefore, after the syringe 20 has been loaded into the dispenser gun, the first plug 160 functions as a plunger that pushes out the viscous material 14.

As illustrated in FIG. 3, although the base portion 62 of the syringe 20 is directly coupled to the base portion 56 of the container 12 in the present embodiment, such direct coupling is not essential to practice the invention; for example, they also may be indirectly coupled via an adaptor. In addition, in another embodiment, a plurality of parallel syringes 20 are connected to one container 12 via a common adaptor.

In the present embodiment, the container 12 and the syringe 20 are directly coupled together, e.g., by screwing together male and female threads, with the container 12 retained in the filling device 10, and the syringe 20 is aligned relative to the container 12 in both of the radial direction and the axial direction.

As illustrated in FIG. 3, a suction tool 180 is inserted into the syringe 20, with the aforementioned container set held by the container holder mechanism 70, and with the aforementioned syringe set coupled to the container set.

The suction tool 180 is held by the syringe holder mechanism 72. In the present embodiment, the syringe holder mechanism 72 holds the suction tool 180 and the suction tool 180 is, in turn, inserted into the syringe 20; consequently, the syringe 20 is held by the syringe holder mechanism 72.

Figure 9:
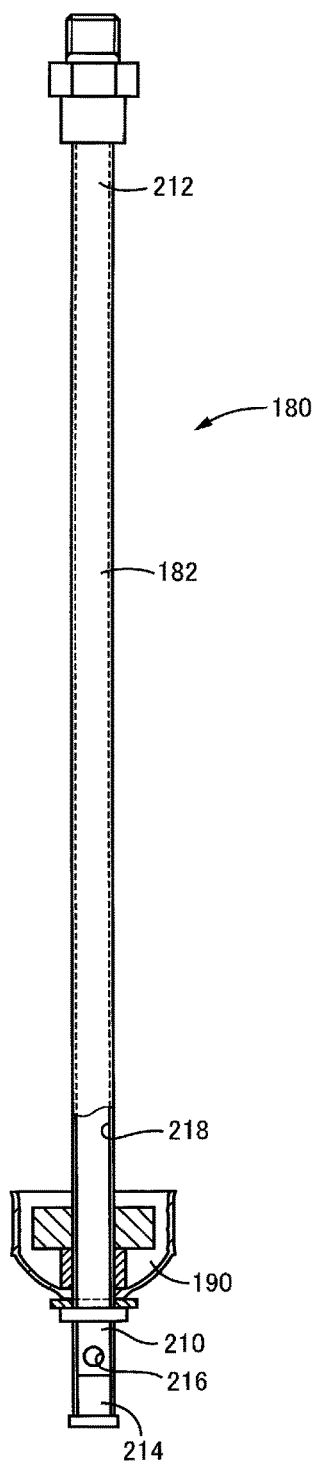
FIG. 9 is a cutaway cross-sectional side view illustrating the suction tool depicted in FIG. 3.
Figure 10:
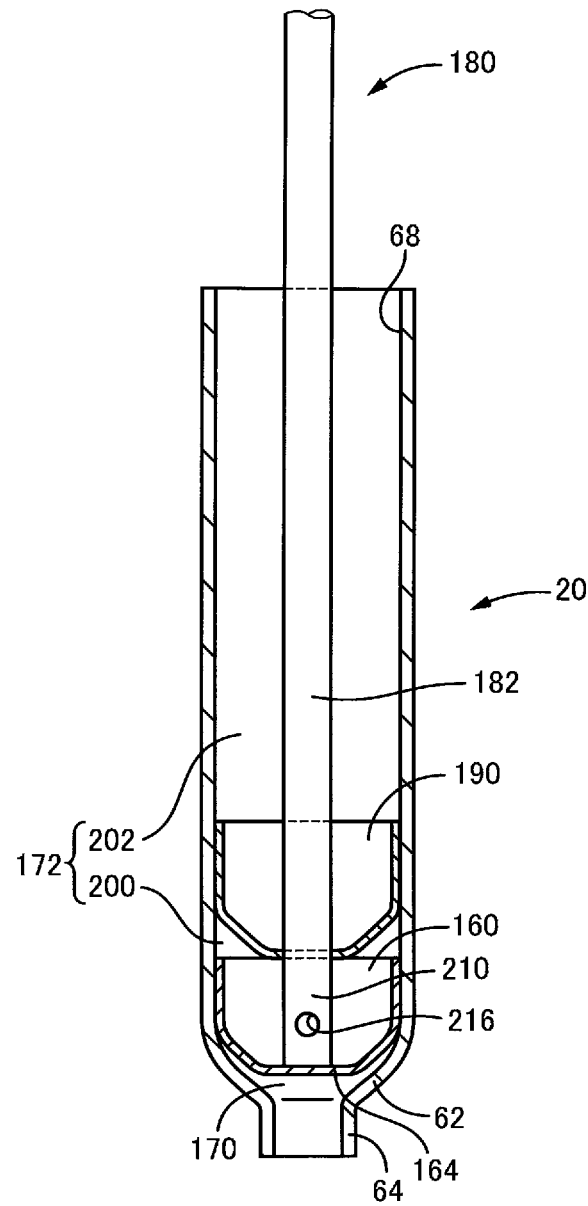
FIG. 10 is a cutaway cross-sectional side illustrating the syringe set depicted in FIG. 7, with the suction tool depicted in FIG. 9 inserted in the syringe set.

In FIG. 9, the suction tool 180 is illustrated in a cutaway cross-sectional side view. The suction tool 180 has a vacuum tube 182, which extends linearly and is rigid, and a second plug 190, which is fixedly secured to the tip end of the vacuum tube 182. The vacuum tube 182 is a steel pipe (can be replaced with a plastic pipe), and serves not only as a conduit for a flow of air to an external vacuum source (not shown), but also as a rod capable of transmitting compressive forces in the axial direction. In FIG. 10, the suction tool 180 is illustrated while being installed in the syringe 20.

The second plug 190 has substantially the same shape and material composition as the first plug 160 depicted in FIG. 8. As illustrated in FIG. 10, the second plug 190 is inserted into the syringe 20, with the second plug 190 disposed in series with the first plug 160, which was previously placed in the syringe 20, and with the second plug 190 in the same orientation as the first plug 160. Due to the insertion of the second plug 190, the second sub-chamber 172 within the syringe 20 is divided into a third sub-chamber 200, which is closer to the first plug 160, and a fourth sub-chamber 202, which is closer to the opening 68.

Similar to the first plug 160, the second plug 190 provides a non-return function for gas (typically, air) when inserted into the syringe 20.

More specifically, within the syringe 20, when the third sub-chamber 200 is at a higher air pressure than the fourth sub-chamber 202, air flow is permitted from the first sub-chamber 170 to the fourth sub-chamber 202 via the radial clearance existing between the inner circumferential surface 162 and an outer circumferential surface of the second plug 190. In contrast, when the third sub-chamber 200 is at a lower air pressure than the fourth sub-chamber 202, the pressure differential causes the inner circumferential surface 162 of the syringe 20 and the outer circumferential surface of the second plug 190 to be brought into air-tight contact with each other, resulting in the blockage of air flow from the fourth sub-chamber 202 to the third sub-chamber 200.

Therefore, the non-return function provided by the second plug 190 enables the third sub-chamber 200 to be subjected to a sub-atmospheric pressure, while the fourth sub-chamber 202 is subjected to an atmospheric pressure.

As illustrated in FIG. 9, the vacuum tube 182 has an anterior end portion 210 and a trailing end portion 212. The vacuum tube 182 is connected to the aforementioned hydraulic pressure control unit at the trailing end portion 212 via a flexible hose (not shown), and is further connected to the aforementioned vacuum source (having an exemplary pressure that is about 0.1 MPa lower than an atmospheric pressure of 0.101325 MPa, or that is stronger) via the hydraulic pressure control unit. The vacuum source, together with the hydraulic pressure control unit, constitutes an example of the device for creating a vacuum.

The second plug 190 is fixedly secured to the anterior end portion 210 at a position slightly spaced away from a tip end surface of the anterior end portion 210. The vacuum tube 182 coaxially extends through the second plug 190 in a substantially air-tight contact with the second plug 190. The tip end surface of the anterior end portion 210 is closed in an air-tight manner by a stop 214. As illustrated in FIG. 10, the anterior end portion 210 abuts, via a tip end surface of the stop 214, on an inner face of an interior surface of the anterior end portion 164 of the first plug 160, which sets a definite approaching limit of the second plug 190 relative to the first plug 160 (i.e., the smallest possible distance between the first plug 160 and the second plug 190).

As illustrated in FIG. 9, a suction hole 216, which radially penetrates through the anterior end portion 210, is formed at a position that is not obstructed by the stop 214. The suction hole 216 is ultimately connected with the aforementioned vacuum source via an inner passage 218 of the vacuum tube 182. As illustrated in FIG. 10, the suction hole 216 is in fluid communication with the third sub-chamber 200 when the stop 214 is in abutment with the first plug 160, which enables the suction tool 180 to create a vacuum within the third sub-chamber 200 or to evacuate the third sub-chamber 200, while the fourth sub-chamber 202 is maintained at atmospheric pressure.

Figure 11:
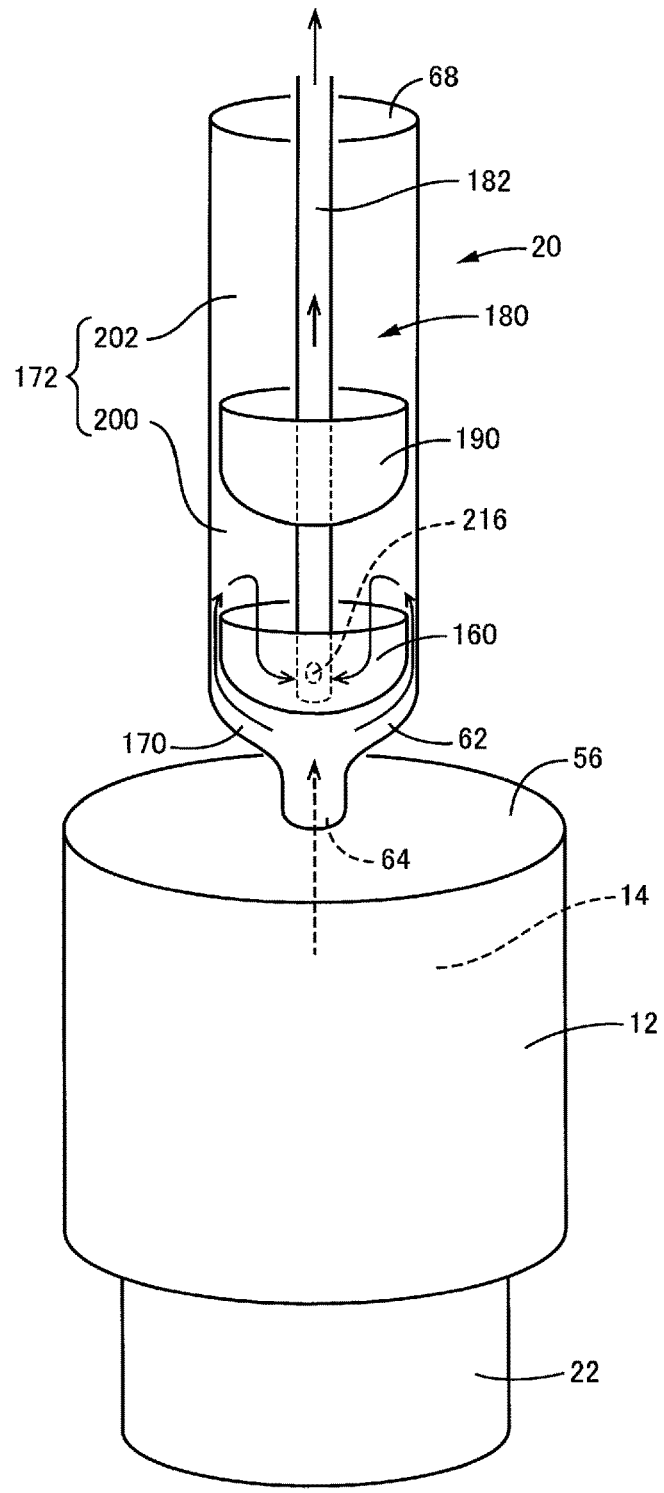
FIG. 11 is a perspective view illustrating an assembly of the container set, the syringe set and the suction tool, depicted in FIG. 3.

As illustrated in FIG. 11, when the third sub-chamber 200 is evacuated, air leaks from the first sub-chamber 170 to the third sub-chamber 200 via the radial clearance between the syringe 20 and the first plug 160, and the leaked air is, in turn, suctioned by the vacuum source via the vacuum tube 182. This causes the first sub-chamber 170 to be evacuated. At this time, the fourth sub-chamber 202 is maintained at atmospheric pressure.

As illustrated in FIG. 11, by pushing the plunger 22 into the container 12, viscous material 14 is extruded from the container 12 via the base portion 56, and the extruded viscous material 14 fills the first sub-chamber 170 under a vacuum. As the volume of viscous material 14 filling the first sub-chamber 170 increases, the first plug 160 is further displaced by the viscous material 14 and moves upwardly relative to the syringe 20. Therefore, the suction tool 180 moves upwardly relative to the syringe 20.

As illustrated in FIGS. 1 and 2, the vacuum tube 182 is fixedly secured to the movable frame 136. The vacuum tube 182 extends coaxially with the vertical centerline of the filling device 10 (coaxial with the centerline of the guide hole 94). The second plug 190 is fixedly secured to the vacuum tube 182, and the second plug 190 is inserted into the syringe 20 without play. As a result, the syringe 20 is aligned relative to the top plate 82.

Next, the filling method will be described in more detail with reference to the process flowchart depicted in FIG. 12, which is followed by description of how to prepare the viscous material 14.

The viscous material 14 is a high-viscosity synthetic resin, and exhibits thermosetting properties, such that the viscous material 14 cures when heated above a prescribed temperature (e.g., 50° C.) ; once cured, the original properties of the viscous material 14 will not be restored even if the temperature decreases. In addition, the viscous material 14 also exhibits the property that, when the viscous material 14 is cooled below a prescribed temperature (e.g., −20° C.) prior to curing and is frozen, the chemical reaction (curing) in the viscous material 14 stops. Thereafter, when the viscous material 14 is heated and thawed, the chemical reaction (curing) in the viscous material 14 restarts.

In the present embodiment, the viscous material 14 is a two-part type that is furnished by mixing two solutions, which are "Solution A" (curing agent) and "Solution B" (major component). An example of "Solution A" is PR-1776 B-2, Part A (i.e., an accelerator component, and a manganese dioxide dispersion) of PRC-DeSoto International, U.S.A., and an example of "Solution B," which is combined with Solution A, is PR-1776 B-2, Part B (i.e., a base component, and a filled modified polysulfide resin) of PRC-DeSoto International, U.S.A.

Therefore, as illustrated in FIG. 12, in order to produce the viscous material 14, the two parts are first mixed in the container 12 in step S11. Next, in step S12, agitating and degassing are performed on the viscous material 14 held in the container 12 using a mixer (not shown). In the present embodiment, the same container 12 is used to mix the two parts for the production of the viscous material 14, and to agitating and degas the viscous material 14 using the mixer. An example of such a mixer is disclosed in Japanese Patent Application Publication No. HEI 11-104404, the content of which is incorporated herein by reference in its entirety. In the present embodiment, such a mixer is used to orbit the container 12 around an orbital axis and simultaneously rotate the container 12 about a rotational axis that is eccentric to the orbital axis, with the container 12 filled with the viscous material 14 under a vacuum, so that the viscous material 14 can be simultaneously agitated and degassed within the container 12.

The viscous material 14 within the mixer is agitated due to the centrifugal force created by the planetary motion produced by the mixer. Further, air bubbles trapped in the viscous material 14 are released from the viscous material 14, due to the synergistic effect of the centrifugal force generated by the planetary motion of the mixer and the negative pressure caused by the vacuum atmosphere; as a result, the viscous material 14 is degassed. This completely or adequately prevents generation of voids within the viscous material 14.

In this agitating/degassing process, the rotating speed and the continuous agitating time of the container 12 by the mixer are set so as to minimize as much as possible both the sizes and/or number of voids that ultimately exist within the viscous material 14 and the amount that the temperature of the viscous material 14 increases due to the agitating/degassing operation. The faster the rotating speed and the longer the continuous agitating time, the greater is the amount that the void formation is suppressed, but the starting time of the curing of the viscous material 14 caused by the higher temperatures due to the joule heating is easily sped up. Thus, for the viscous material 14, there is a relationship of the tradeoffs between the void conditions and the temperature conditions. Therefore, in the present embodiment, the rotating speed and the continuous agitating time are set so that the void conditions and the temperature conditions can be both maximized.

After the viscous material 14 has been mixed and agitated/degassed within the container 12 in the manner described above, an operation that transfers and fills the viscous material 14 from the container 12 into the syringe 20 starts as illustrated in FIG. 12.

In step S21, the operator first inserts the plunger 20 into the container 12 that has been filled with the viscous material 14, as illustrated in FIG. 5, to thereby prepare the container set. In step S22, the operator next attaches the container set to the container holder mechanism 70 of the filling device 10 with the container set inverted, as illustrated in FIG. 3, to thereby retain the container set in the filling device 10.

More specifically, prior to the retention of the container set in the container holder mechanism 70, the movable plate 100 is retreated downwardly from the container set. The operator first puts the container set on the retreated movable plate 100 at a prescribed position and in an inverted orientation. Thereafter, the operator raises the movable plate 100 together with the container set until the container 12 abuts on the top plate 82. Lastly, the operator fixes the movable plate 100 at that position.

Subsequently, in step S23, the operator inserts the first plug 160 into the syringe 20 as illustrated in FIG. 7, to thereby prepare the syringe set. Thereafter, in step S24, the syringe set is coupled to the container set, which was previously retained by the filling device 10 in an inverted orientation, in a substantially air-tight manner, as illustrated in FIG. 3, to thereby retaining the syringe set in the filling device 10.

Prior to the attachment of the syringe set to the filling device 10, the air cylinder 130 is placed in the aforementioned advanced mode, in which the vertically-movable rod 142 pushed out; as a result, the suction tool 180 is in a position that is upwardly retreated from the syringe 20. In other words, the suction tool 180 does not obstruct the attachment of the syringe set to the filling device 10.

Subsequently, in step S25, the air cylinder 132 is switched to the aforementioned retracted mode to retract the vertically movable rod 142 and to thereby insert the retreated suction tool 180 into the syringe 20. The suction tool 180, which includes the vacuum tube 182 and the second plug 190, is downwardly moved by the air cylinder 132 until the stop 214 of the vacuum tube 182 abuts on the first plug 160, which was previously put into the syringe 20.

Thus, as illustrated in FIG. 3, the first plug 160 and the second plug 190 will be positioned within the syringe 20 in series with each other, with the first plug 160 located below and the second plug 190 located above. An advancing limit of the first plug 160 is defined by abutting on a tip end portion of a portion, which forms the discharge passage 57, within the base portion 56 of the container 12.

Thereafter, the air cylinder 132 is switched to the aforementioned floating mode; as a result, if the assistance by the gas spring 150 is disregarded, the force acting on the first plug 160 from the vacuum tube 182 has a value equal to the summation of the weight of the vacuum tube 182 and the weight of member(s), which move together with the vacuum tube 182, minus the value of the sliding resistance. This force is a force that urges the first plug 160 in the direction towards the base portion 62 of the syringe 20, and is a force that reduces the volume of the first sub-chamber 170.

Thereafter, in step S26, the vacuum source suctions air from the third sub-chamber 200 via the vacuum tube 182, to thereby evacuate the third sub-chamber 200, as illustrated in FIG. 11. The first sub-chamber 170 is also evacuated thereby. Although the viscous material 14 will be dispensed from the container 12 into the first sub-chamber 170 after this, prior thereto, there is substantially no air in the first sub-chamber 170 that would cause voids to exist within the viscous material 14.

As is apparent from the above description, according to the present embodiment, the third sub-chamber 200 within the syringe 20 is evacuated by the vacuum tube 182, and then with the third sub-chamber 200 acting as a second vacuum source, the first sub-chamber 170 is evacuated due to the air flow via the radial clearance between the inner circumferential surface of the syringe 20 and the outer circumferential surface of the first plug 160.

As a result, a pressure differential is generated by the first sub-chamber 170 and the third sub-chamber 200 within the syringe 20, which are at a higher pressure than the aforementioned external vacuum source that is connected at the distal end of the vacuum tube 182. Due to this pressure differential, air present in the first sub-chamber 170 flows into the third sub-chamber 200 via the radial clearance between the inner circumferential surface 162 of the syringe 20 and the outer circumferential surface of the first plug 160; consequently, the air is discharged to outside of the syringe 20 via the vacuum tube 182. As a result, during the filling of the viscous material 14 into the first sub-chamber 170, air is not incorporated into the viscous material 14.

Consequently, according to the present embodiment, once the space within the syringe 20 is evacuated, in order to prevent incorporation of air into the viscous material flowing into the syringe 20, it is not necessary to provide an air-tight housing for holding both the container 12 and the syringe 20 in order to prevent air from being introduced into the viscous material 14 while the viscous material 14 is entering the syringe 20.

Therefore, according to the present embodiment, it is not necessary to provide a housing for holding the entirety of the container 12 and the syringe 20 in an air-tight manner and it is not necessary to evacuate such a housing in order to prevent air from being incorporated into the viscous material 14 during the filling process.

As a result, according to the present embodiment, for preventing air from being incorporated into the viscous material 14 during the filling process, the trend of increasing the part count and the trend of increasing the size of the filling device 10 are reduced; consequently, the trend of increasing the weight and cost is reduced.

Further, according to the present embodiment, the filling of the viscous material 14 can be performed using the filling device 10 even in a work environment in which only a confined workspace is available; moreover, the maximum number of the containers 12 and the syringes 20 that can possibly occupy the same workspace at the same time can be easily increased.

Still further, according to the present embodiment, because the first sub-chamber 170 that will be filled with the viscous material 14 is evacuated, in case air is entrapped in the viscous material 14 before the filling, it will be degassed during the filling, i.e. it is possible to extract from the viscous material 14 any air that has been incorporated therein at the same time.

Still further, according to the present embodiment, a force (i.e. a force acting in the direction from the opening 68 towards the first sub-chamber 170) is applied to the first plug 170 within the syringe 20 by the weight of the vacuum tube 182 in the direction moves it towards the viscous material 14 that has flowed into the syringe 20. The direction of the applied force is the direction that reduces the volume of the first sub-chamber 170. In addition, the evacuation of the first sub-chamber 170 also facilitates the reduction in the volume of the first sub-chamber 170.

Therefore, according to the present embodiment, air that is present in the first sub-chamber 170 is caused to be evacuated through the radial clearance between the syringe 20 and the first plug 160 by the cooperative action of the application of the force by the vacuum tube 182 and the evacuation of the first sub-chamber 170.

Still further, according to the present embodiment, a force is applied to the first plug 160 within the syringe 20 by the weight of the vacuum tube 182 in the direction that moves it towards the viscous material 14 that has flowed in the syringe 20. The direction of the applied force is the direction that reduces the volume of the first sub-chamber 170. In addition, the evacuation of the first sub-chamber 170 also facilitates the reduction in the volume of the first sub-chamber 170.

Therefore, according to the present embodiment, air that is present in the first sub-chamber 170 is caused to be evacuated through the radial clearance between the syringe 20 and the first plug 160 by the cooperative action of the application of the force by the vacuum tube 182 and the evacuation of the first sub-chamber 170.

Subsequently, in step S27, by the air cylinder 120 extending the rod 122 as illustrated in FIG. 1, the pusher 124 first engages with the engagement portion 59 of the plunger 22 from the rear side thereof, as illustrated in FIG. 3. Thereafter, when the air cylinder 120 further extends the rod 122, the plunger 22 rises and is pushed into the container 12. With this, the viscous material 14 is extruded from the container 12 against the force of gravity, to thereby initiate the filling of the first sub-chamber 170.

Thereafter, the entire first sub-chamber 170, which is in the initial state depicted in FIGS. 3 and 7, is filled with the viscous material 14. Subsequently, as the filling of the viscous material 14 continues, the volume of the first sub-chamber 170 increases and the first plug 160, the second plug 190, the vacuum tube 82 and the movable frame 136 rise. At his time, the viscous material 14 within the first sub-chamber 170 is prevented from leaking into the third sub-chamber 200 by the cooperative action of its viscosity and the miniscule radial clearance between the inner circumferential surface 162 of the syringe 20 and the outer circumferential surface of the first plug 160.

Prior to the filling of the viscous material 14 into the syringe 20, the gas spring 150 depicted in FIG. 2 is in a compressed state due to the movable frame 136. In response thereto, the gas spring 150 applies a force to the movable frame 136 that lifts the movable frame 136 together with the suction tool 180.

The downward force due to the weight of the movable frame 136 and the suction tool 180 slightly exceeds the lifting force exerted onto the movable frame 136 and the suction tool 180 by the gas spring 150. That is, the downward force of the movable frame 136 and the suction tool 180 is partially offset by the upward face of the gas spring 150; as a result, the downward force of the movable frame 136 and the suction tool 180 acting on the first plug 160 is less than if the gas spring 150 were not present and it is easier for the first plug 160 to rise.

Therefore, after the entire first sub-chamber 170, which is in the initial state depicted in FIGS. 3 and 7, is filled with the viscous material 14, and when the volume of the first sub-chamber 170 further increases, it is thereby possible to raise the first plug 160, the suction tool 180 (including the second plug 190 and the vacuum tube 182) and the movable frame 136 without increasing much the pressure of the viscous material 14 within the first sub-chamber 170. In other words, in the present embodiment, the lifting of the suction tool 180 (including the second plug 190 and the vacuum tube 182) and the movable frame 136 in step S28 is mechanically assisted by the gas spring 152.

Thereafter, when the plunger 22 advances up to the advancing limit and bottoms out in the container 12, by the air cylinder 132 extending the vertically movable rod 142 in step S29, the suction tool 180 is lifted with the first plug 160 remaining as is in the syringe 20, and the suction tool 180 is retracted from the syringe 20.

Subsequently, in step S30, the syringe set is removed from the container 12 and the filling device 10. Thereafter, instep S31, the container set is removed from the filling device 10. Then, the transferring and filling of the viscous material 14 from the one container 12 to the one syringe 20 is completed.

Next, a second embodiment of the present invention will be described. The present embodiment, however, is similar to the first embodiment in many elements; therefore, the present embodiment will be described in detail with regard to only the elements that differ from those of the first embodiment, while a redundant description of the elements common with those of the first embodiment will be omitted by using the same reference numerals.

In the first embodiment, the second plug 190 in addition to the first plug 160 is inserted into the syringe 20, and the vacuum tube 182 is engaged with the first plug 160, whereby the first sub-chamber 170 is evacuated.

Figure 13:
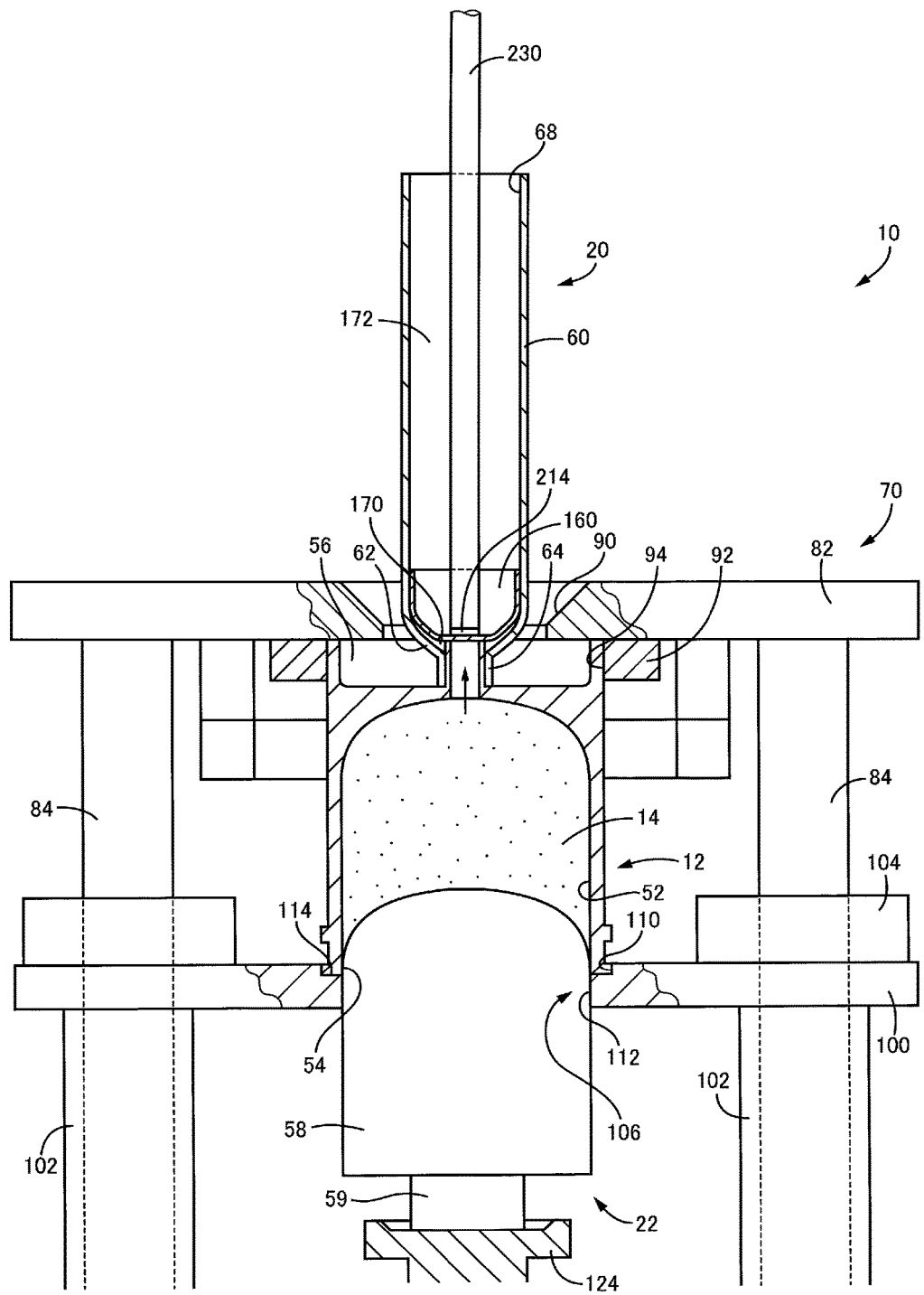
FIG. 13 is a cutaway cross-sectional front view illustrating a relevant portion of a viscous-material filling device (hereinafter, referred to simply as "filling device"), when in use, that is suitable for use in performing a viscous-material filling method (hereinafter, referred to simply as "filling method") according to a second embodiment of the invention.

In contrast thereto, in the present embodiment as compared to the first embodiment, the second plug 190 is omitted, and as illustrated in FIG. 13, a simple rod 230 that is not connected with the aforementioned vacuum source engages with the first plug 160, so that the rod 230 only functions to urge the first plug 160 towards the base portion 62 of the syringe 20, without evacuating the first sub-chamber 170. The basic structure of the rod 230 is similar to the vacuum rod 182 depicted in FIG. 9, except for elements associated with the second plug 190.

However, the rod 230 is held by the filling device 10 in a similar manner to the vacuum tube 182. More specifically, the rod 230 is moved upward and downward by the air cylinder 132, and a lifting force is exerted thereon by the gas spring 152. The rod 230, in the present embodiment, is comprised of a steel pipe, similar to the vacuum tube 182, so that the rod 230 can have the required rigidity (for transmitting a compressive force in the axial direction) with a reduced weight. Alternatively, the rod 230 may be a plastic pipe, or steel or plastic bar that is not hollow, but rather is solid.

In FIG. 14, the filling method according to the present embodiment is illustrated in a process flowchart. In the present embodiment, all the steps of the filling method are common with those of the first embodiment, except step S25 and its subsequent steps; therefore, the filling method will be described with regard to only the steps that differ from those of the first embodiment, while a redundant description of the steps common with those of the first embodiment will be omitted.

In step S25, similar to step S25 depicted in FIG. 12, the air cylinder 132 retracts the vertically movable rod 142, to thereby insert the retreated rod 230 into the syringe 20. The rod 230 is downwardly moved by the air cylinder 132 until the stop 214 of the rod 230 abuts on the first plug 160 that is already present within the syringe 20. The first plug 160 and the rod 230 within the syringe 20 are thereby positioned in series with each other, as illustrated in FIG. 13. The advancing limit of the first plug 160 is defined by the abutment on a tip end portion of the portion, which forms the discharge passage 57, within the base portion 56 of the container 12.

Thereafter, the air cylinder 132 is switched to the aforementioned floating mode; as a result, if the aforementioned assistance by the gas spring 150 is disregarded, the force acting on the first plug 160 from the rod 230 a value equal to the summation of the weight of the rod 230 and the weight of member(s), which move together with the rod 230, minus the sliding resistance. This force is a force that urges the first plug 160 in the direction towards the base portion 62 of the syringe 20, and is a force that reduces the volume of the first sub-chamber 170.

Thereafter, in step S26, similar to step S27 depicted in FIG. 12, the plunger 22 rises and is pushed into the container 12, as illustrated in FIG. 13. With this, the viscous material 14 is extruded from the container 12 against the force of gravity, to thereby initiate the filling of the first sub-chamber 170.

In the present embodiment, prior to the filling of the viscous material into the syringe 20, air is present within the first sub-chamber 170 of the syringe 20; nevertheless, during the filling, the first sub-chamber 170 is not evacuated.

Figure 15:
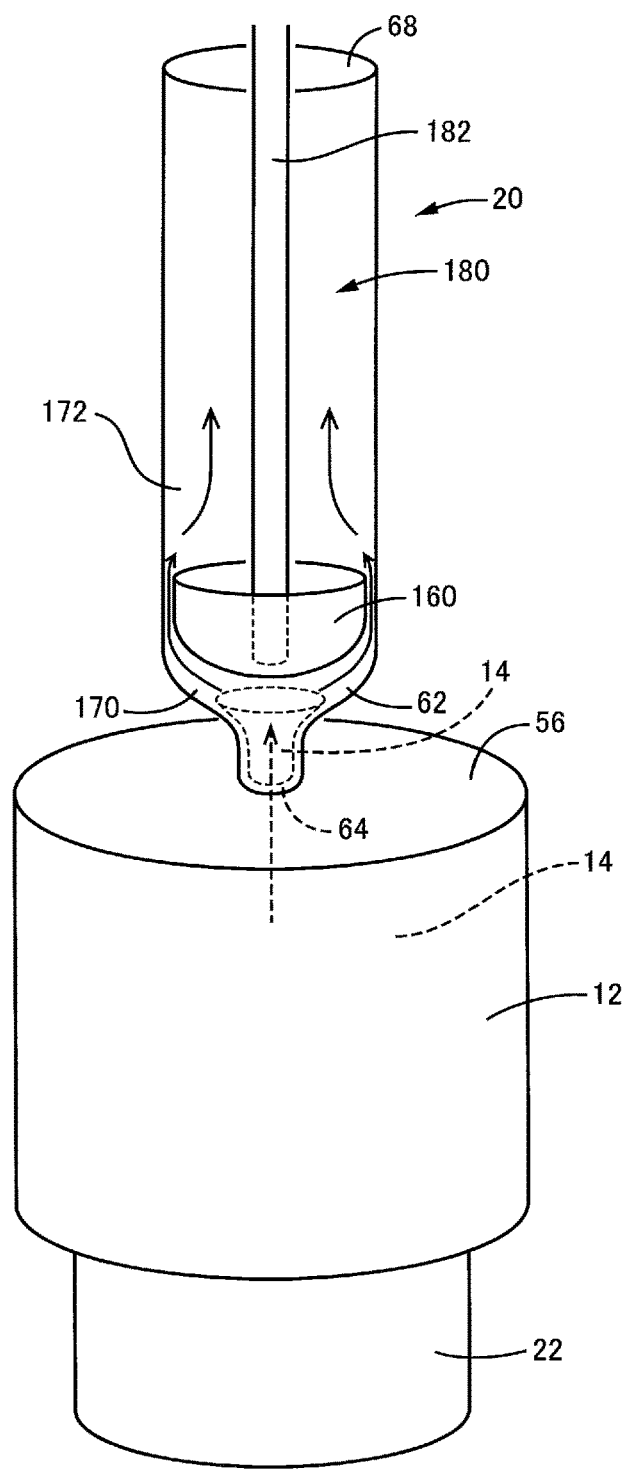
FIG. 15 is a perspective view illustrating the container set, the syringe set and the rod depicted in FIG. 13.

However, in the present embodiment as illustrated in FIG. 15, when the viscous material 14 flows from the container 12 into the first sub-chamber 170 of the syringe 20, air present within the first sub-chamber 170 is compressed by the in-flowing viscous material 14.

As a result, a pressure differential is generated within the syringe 20, because the first sub-chamber 170 is at a higher pressure than the second sub-chamber 172 (at atmospheric pressure), which is in communication with outside of the syringe 20. Due to this pressure differential, air within the first sub-chamber 170 flows into the second sub-chamber 172 via the radial clearance between the inner circumferential surface 162 of the syringe 20 and the outer circumferential surface of the first plug 160, and consequently, it is discharged from the opening 68 of the syringe 20 to the outside.

As a result, according to the present embodiment, during the filling of the viscous material 14 into the first sub-chamber 170, the air is discharged from the first sub-chamber 170, and air is prevented from being incorporated into the viscous material 14 within the first sub-chamber 170.

Further, according to the present embodiment, a force is applied to the first plug 160 within the syringe 20 by the rod 230 in the direction that reduces the volume of the first sub-chamber 170. The applied force is a force that displaces the first plug 160 towards the viscous material 14 that has flowed into the syringe 20.

For these reasons, according to the present embodiment, due to the application of the aforementioned force by the rod 230, the above-mentioned pressure differential is again created and a larger pressure differential is generated within the syringe 20 than if a force were not applied by the rod 230. A phenomenon is thereby promoted that air present within the first sub-chamber 170 flows into the second sub-chamber 172 through the radial clearance between the inner circumferential surface 162 of the syringe 20 and the outer circumferential surface of the first plug 160.

Thus, according to the present embodiment, in order to prevent air from mixing into the viscous material 14 during the filling of the viscous material 14 from the container 12 into the syringe 20, there is no need to evacuate the inner chambers within the container 12 and the syringe 20 (in particular, the chamber within the syringe 20). As a result, it is possible to prevent air from being mixed into the viscous material 14 during the filling of the viscous material 14 into the syringe 20, without requiring the provision of a housing that holds both the container 12 and the syringe 20 in an air-tight manner.

Thereafter, the entire first sub-chamber 170, which is in the initial state depicted in FIG. 13, is filled with the viscous material 14 (replacing the air initially present within the first sub-chamber 170 with viscous material 14). Subsequently, as the filling of the viscous material 14 continues, the volume of the first sub-chamber 170 increases and the first plug 160, the rod 230 and the movable frame 136 rise. At his time, the viscous material 14 within the first sub-chamber 170 is prevented from leaking into the second sub-chamber 172 by the cooperative action of its viscosity and the radial clearance between the inner circumferential surface 162 of the syringe 20 and the outer circumferential surface of the first plug 160.

Prior to the filling of the viscous material 14 into the syringe 20, the gas spring 150 depicted in FIG. 2 is in a compressed state due to the movable frame 136. In response thereto, the gas spring 150 applies a force to the movable frame 136 that lifts the movable frame 136 together with the rod 230.

Therefore, after the entire first sub-chamber 170, which is in the initial state depicted in FIGS. 3 and 7, is filled with the viscous material 14, and when the volume of the first sub-chamber 170 further increases, it is possible to raise the first plug 160, the rod 230 and the movable frame 136 without increasing much the pressure of the viscous material 14 within the first sub-chamber 170. In other words, in step S27 in the present embodiment, the lifting of the rod 230 and the movable frame 136 is mechanically assisted by the gas spring 152.

Thereafter, when the plunger 22 bottoms out in the container 12, in step S28, the rod 230 is raised with the first plug 160 remaining as is within the syringe 20, and the rod 230 is retracted from the syringe 20, similar to step S29 depicted in FIG. 12.

Subsequently, in step S29, the syringe set is removed from the container 12 and the filling device 10, similar to step S30 depicted in FIG. 12. Thereafter, in step S31, the container set is removed from the filling device 10, similar to step S30 depicted in FIG. 12. Then, the transferring and filling of the viscous material 14 from the one container 12 to the one the syringe 20 is completed.

Next, a third embodiment of the present invention will be described. The present embodiment, however, is similar to the first or second embodiment, except for the container set; therefore, the present embodiment will be described in detail with regard to only the container set, while a redundant description of the elements common with those of the first or second embodiment will be omitted.

Figure 16:
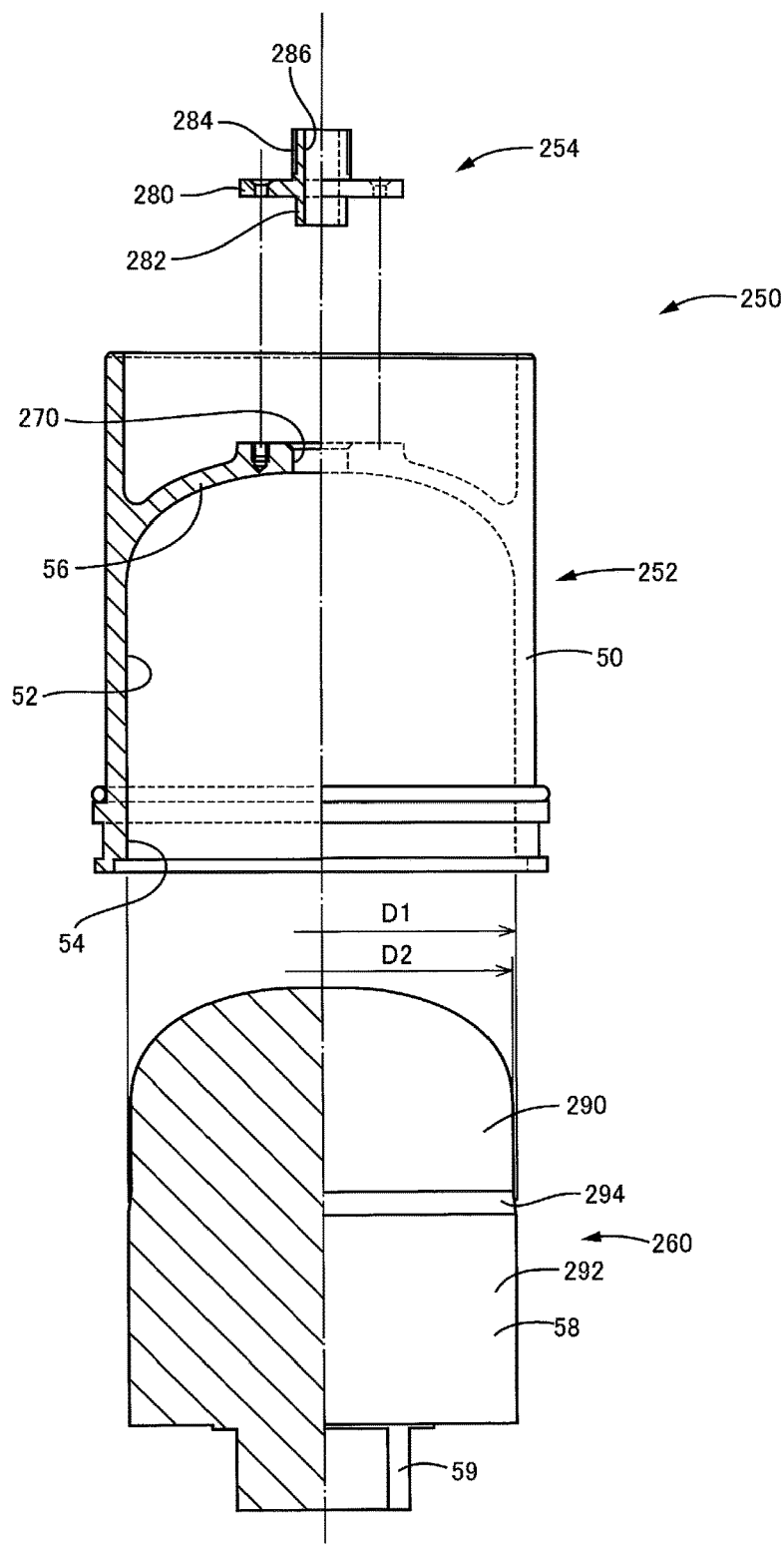
FIG. 16 is an exploded view illustrating a container set of a viscous-material filling device (hereinafter, referred to simply as "filling device") that is suitable for use in performing a viscous-material filling method (hereinafter, referred to simply as "filling method") according to a third embodiment of the invention.

In FIG. 16, the container set that is used for performing the filling method according to the present embodiment is illustrated in an exploded view. The container set has a basic structure that is similar to the container set depicted in FIG. 5. However, the container set according to the present embodiment differs from the container set depicted in FIG. 5 in that container 250 is constituted by two separable components including a main body 252 and a plug 254, and that the portion of a plunger 260, which is inserted into the container 250, is not uniform in diameter in the axial direction.

More specifically, the main body 252 is constituted by including the housing 50, the chamber 52, the opening 54 and the base portion 56. A through hole 270 that extends longitudinally with a circular cross-section is formed in the central portion of the base portion 56. The plug 254 is constituted by integrally including a base plate 280, an engagement shaft 282 that extends from one of the two faces of the base plate 280, and a coupling shaft 284 that extends from the opposite face of the base plate 280. The plug 254 is made of a synthetic resin such as Teflon (registered trademark), but the plug 254 may be alternatively made of other materials. The plug 254 has a through hole 286 that simultaneously penetrates through those three portions 280, 282 and 284.

When the plug 254 is affixed to the main body 252, the engagement shaft 282 fits into the through hole 270 of the base portion 56. The coupling shaft 284 is used to couple the container 250 with the base portion 62 of the syringe 20 in a substantially air-tight manner; more specifically, the coupling shaft 284 is fitted into the tubular portion 64 of the base portion 62. In the present embodiment, a male thread is formed on the outer circumferential surface of the coupling shaft 284, while a female thread is formed on the inner circumferential surface of the tubular portion 64; the coupling shaft 284 and the tubular portion 64 are connected by screwing them together.

The plug 254 is removably attached to the main body 252, to maintain this attachment, the plug 254 is fastened to the main body 254 by being screwed together. The container 250 is completed by attaching the plug 254 to the main body 252, and in this state, the viscous material 14 is transferred from the chamber 52 of the container 250 into the syringe 20. In other words, the through hole 286 provides the same function as the discharge passage 57.

Thus, in the present embodiment, the plug 254 is separable from the main body 252. In addition, because the plug 254 is commonly used for a plurality of individual syringes 20, the coupling shaft 284 quickly becomes worn out. Consequently, according to the present embodiment, replacement of the plug 254 can be performed independently of the replacement of the main body 252, which prevents the main body 252 from being unnecessarily replaced when the plug 254 requires replacement.

As illustrated in FIG. 16, the main body 58 of the plunger 260 has a tip end portion 290 having a hemispheric shape, a base end portion 292 adjacent to the engagement portion 59, and an intermediate portion 294 located therebetween. The tip end portion 290, the base end portion 292 and the intermediate portion 294 each have a circular cross-section, but the diameter D2 of the tip end portion 290 is smaller than the diameter D1 of the base end portion 292. In addition, the intermediate portion 294 is tapered such that its diameter changes from a value equal to the diameter D2 of the tip end portion 290 to a value equal to the diameter D1 of the base end portion 292.

Because the diameter D1 of the base end portion 292 is substantially equal to the diameter of the chamber 52 of the main body 252 (equal to the diameter of the opening 54), when the base end portion 292 is inserted and held in the chamber 52, there is only a small, circumferentially-extending radial clearance CL1 between an outer circumferential surface of the base end portion 292 and an inner circumferential surface of the chamber 52.

Due to this, in this state, even if viscous material 14 is present within the chamber 52 and air is present between a rear face of the viscous material 14 within the chamber 52 and a tip end face of the plunger 260, neither the viscous material 14 nor the air substantially leaks to the outside via the clearance CL1.

In contrast, when the tip end portion 290 is inserted and held in the chamber 52, a clearance CL2 having a radial dimension larger than that of the clearance CL1 is created between the outer circumferential surface of the base end portion 292 and the inner circumferential surface of the chamber 52. For this reason, in this state, leakage of some of the viscous material 14 and air present between the rear face of the viscous material 14 within the chamber 52 and the tip end face of the plunger 260 to the outside via the clearance CL2 is facilitated.

Incidentally, when the plunger 260 is caused to be inserted into the container 250 while the chamber 52 is filled with the viscous material 14, the plunger 260 is inserted into the chamber 52 together with the air located in front of the plunger 260. When the plunger 260 reaches its advancing limit within the container 250, and when the transfer of all the viscous material 14 from the container 250 to the syringe 20 has been completed, the air, which has entered into the chamber 52 as a result of the introduction of the plunger 260, will be present in the first sub-chamber 170 of the syringe 20.

As a result, the viscous material 14 as well as air is present within the first sub-chamber 170 of the syringe 20. When this air is present, the operator will be inconvenienced when attempting to operate the aforementioned dispenser gun to dispense individual doses of the viscous material 14, because the dispenser gun the dispenser gun will dispense only air at the beginning of the dispensing process, and it will not dispense a dose of the viscous material 14 which must be dispensed; also, the air within the first sub-chamber 170 can be trapped within the viscous material 14, individual doses of the viscous material 14, which have been dispensed from the dispenser gun and applied to a target object, can trap air bubbles, and the trapped air bubbles can create voids within the doses of the viscous material 14 applied to the target object.

In contrast, in the present embodiment, when the insertion of the plunger 260 into the container 250 starts, the tip end portion 290 first enters the container 250; at this time, the clearance CL2 is formed between the outer circumferential surface of the tip end portion 290 and the inner circumferential surface of the chamber 52. If air is present between the tip end portion 290 and the viscous material 14 held in the chamber 52, the air will be displaced by the advancing tip end portion 290, resulting in discharge of the air to the outside via the clearance CL2.

At this time, while not only the air but also the viscous material 14 are displaced by the advancing tip end portion 290, the viscous material 14 is not easily expunged via the clearance CL2 due to its viscosity. In other words, the clearance CL2 serves as a filter that permits only the air to be expunged though the filter.

The maximum possible volume of air that enters the chamber 52 when the plunger 260 is inserted into the chamber 250 can be estimated with a certain degree of precision, depending on the profile (typically, flat) of the rear end of the mass of the viscous material 14 that fills the chamber 52, the viscosity (ease of changing material shape) of the viscous material 14 that fills the chamber 52, the profile of the tip end portion 290, and the area of the cross section of the plunger 260.

Therefore, it is possible to estimate the required stroke of the plunger 260 to expunge via the clearance CL2 substantially all of the maximum possible volume of air that has entered into the chamber 52 from the chamber 250. The axial length of the tip end portion 290 is pre-set in such a manner that, when the predicted stroke is reached, the intermediate portion 294 enters into the container 250, and thereafter, the base end portion 292 starts to enter into the container 250. After the base end portion 292 enters the chamber 52, the viscous material 14 is prevented from being expunged from the chamber 52.

Therefore, according to the present embodiment, by partially or completely preventing the ingress of air into the container 250 due to the plunger 260 being inserted into the container 250, the possibility is eliminated that air rather than the viscous material 14 will be dispensed from the dispenser gun and that voids will form within the viscous material 14, which has been dispensed from the dispenser gun and applied to the target object.

The present specification provides a complete description of the compositions of matter, methodologies, systems and/or structures and uses in exemplary implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology thereof. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

The invention claimed is:

1. A method for transferring a viscous material from a container into a dispensing syringe to fill the dispensing syringe, the dispensing syringe having a main body portion, a first open end and a second open end, the first open end comprising a discharge port smaller in inner diameter than the main body portion,
the syringe further including a plug configured to permit gas flow in only one direction, the plug being inserted into the syringe such that the plug divides a chamber within the syringe into a first sub-chamber in communication with the discharge port and a second sub-chamber in communication with the second open end of the syringe;
the method comprising:
inserting a rod into the syringe from the second open end of the syringe such that the rod engages the plug;
applying a force to the plug via the rod in a direction of the first open end; and
with the force being applied to the plug, extruding the viscous material from the container and through the discharge port into the first sub-chamber of the syringe.

2. A method for transferring and filling a viscous material from a container into a dispensing syringe,
wherein the syringe comprises:
a main body portion having an inner chamber defined by an inner circumferential surface of the main body portion, a tubular portion located at a first end of the main body portion, through which the viscous material is to be discharged, the tubular portion being smaller in diameter than the main body portion, and an opening located at a second end of the main body portion opposite the first end of the main body portion, and
a plug fitted in the syringe and dividing the inner chamber into a first sub-chamber located between the plug and the tubular portion and a second sub-chamber located between the plug and the opening, the plug being configured to permit gas flow in one direction in the syringe,
the method comprising:
inserting a rod into the second sub-chamber of the syringe through the opening such that the rod engages with the plug;
imparting, via the rod, a force against the plug to decrease a volume of the first sub-chamber until a gas initially present in the first sub-chamber is at least substantially evacuated from the first sub-chamber through a radial clearance between the plug and the syringe;
with the rod engaged with the plug, extruding the viscous material from the container into the first sub-chamber of the syringe through the tubular portion such that the viscous material is transferred into the first sub-chamber through the tubular portion while the plug moves away from the tubular portion to increase the volume of the first sub-chamber; and
after completing the filling of the first sub-chamber with the viscous material, retracting the rod from the second sub-chamber of the syringe without removing the plug from the syringe.

3. The method according to claim 2, further comprising:
inserting a plunger into the container; and
connecting the container and the syringe with each other, wherein the viscous material is extruded from the container by pushing the plunger within the container.

4. The method according to claim 2, wherein the plug is configured to provide a resistance to the flow of viscous material through the clearance due to a viscosity of the viscous material, the clearance being formed between the inner circumferential surface of the main body portion and an outer circumferential surface of the plug, such that a flow of viscous material from the first sub-chamber to the second sub-chamber and a flow of viscous material from the second sub-chamber to the first sub-chamber are blocked.

5. The method according to claim 2, further comprising:
after an initial volume of the first sub-chamber is filled with the viscous material to replace the gas initially present within the initial volume of the first sub-chamber, allowing the volume of the first sub-chamber to increase and allowing the first sub-chamber to be filled with the viscous material by withdrawing the rod and allowing the plug to move toward the opening, the viscous material within the first sub-chamber being prevented from leaking into the second sub-chamber by the cooperative action of a viscosity of the viscous material and a radial clearance between the inner circumferential surface of the syringe and the outer circumferential surface of the plug.

6. A method for transferring a viscous material from a container into a dispensing syringe to fill the dispensing syringe, the dispensing syringe having: a main body portion, a first open end comprising a discharge port smaller in inner diameter than the main body portion, a second open end and a plug configured to permit gas flow in only one direction, the plug being inserted into the syringe such that the plug divides a chamber into a first sub-chamber in communication with the discharge port and a second sub-chamber in communication with the second open end,
the method comprising:
inserting a rod into the syringe from the second open end of the syringe such that the rod engages the plug;
extruding the viscous material from the container and through the discharge port into the first sub-chamber of the syringe; and
after completing the filling of the first sub-chamber with the viscous material, retracting the rod from the second sub-chamber of the syringe without removing the plug from the syringe.

* * * * *